(12) United States Patent
Liu et al.

(10) Patent No.: US 12,369,175 B2
(45) Date of Patent: Jul. 22, 2025

(54) RESOURCE DETERMINING METHOD AND APPARATUS

(71) Applicant: Huawei Technologies Co., Ltd., Shenzhen (CN)

(72) Inventors: Yun Liu, Shenzhen (CN); Haibo Xu, Beijing (CN); Zhou Wang, Shenzhen (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 17/997,080

(22) PCT Filed: Apr. 27, 2021

(86) PCT No.: PCT/CN2021/090206
§ 371 (c)(1),
(2) Date: Oct. 25, 2022

(87) PCT Pub. No.: WO2021/218956
PCT Pub. Date: Nov. 4, 2021

(65) Prior Publication Data
US 2023/0180270 A1    Jun. 8, 2023

(30) Foreign Application Priority Data
Apr. 27, 2020   (CN) .......................... 202010342264.0

(51) Int. Cl.
*H04W 72/40*   (2023.01)
*H04W 72/542*  (2023.01)
*H04W 72/51*   (2023.01)

(52) U.S. Cl.
CPC ......... *H04W 72/40* (2023.01); *H04W 72/542* (2023.01); *H04W 72/51* (2023.01)

(58) Field of Classification Search
CPC ..... H04W 72/00; H04W 72/40; H04W 72/50; H04W 72/54; H04W 72/542; H04W 28/00; H04W 72/02; H04W 72/51
See application file for complete search history.

(56) References Cited

U.S. PATENT DOCUMENTS

2013/0223409 A1   8/2013   Jung et al.
2015/0334760 A1   11/2015  Sartori et al.
(Continued)

FOREIGN PATENT DOCUMENTS

CN   102625461 A    8/2012
CN   110351858 A    10/2019
(Continued)

OTHER PUBLICATIONS

Intel Corporation, "Sidelink Resource Allocation Design for NR V2X Communication," 3GPP TSG RAN WG1 Meeting #96bis, Xi'an, China, Apr. 8-12, 2019, R1-1904296, 15 pages.
(Continued)

*Primary Examiner* — Warner Wong
(74) *Attorney, Agent, or Firm* — SLATER MATSIL, LLP

(57) ABSTRACT

This specification provides a resource determining method and an apparatus, to optimize sidelink transmission performance. In this specification, a first communication apparatus may receive preferred resource information and/or non-preferred resource information, determine a transmission resource based on received resource information and a type of the first communication apparatus, and perform sidelink transmission by using the transmission resource. First resource information can indicate a high-interference or high-usage resource and/or a low-interference or low-usage resource. The first communication apparatus can select, based on the type of the first communication apparatus, a resource with relatively low interference to perform sidelink
(Continued)

S101: Obtain first resource information

S102: Determine a transmission resource based on a type of a first communication apparatus and the first resource information S103: Transmit sidelink transmission data by using the transmission resource transmission. This improves sidelink transmission performance.

20 Claims, 4 Drawing Sheets

(56) References Cited

U.S. PATENT DOCUMENTS

| | | | |
|---|---|---|---|
| 2019/0075548 A1* | 3/2019 | Lee | H04W 4/40 |
| 2019/0182840 A1 | 6/2019 | Feng et al. | |
| 2019/0364501 A1* | 11/2019 | Kwon | H04W 72/51 |
| 2020/0029245 A1* | 1/2020 | Khoryaev | H04W 36/22 |
| 2020/0029340 A1* | 1/2020 | He | H04W 72/25 |
| 2020/0305152 A1* | 9/2020 | Yasukawa | H04W 92/18 |
| 2020/0367221 A1* | 11/2020 | Maaref | H04W 72/52 |
| 2021/0051525 A1* | 2/2021 | Cao | H04W 76/14 |
| 2021/0160852 A1* | 5/2021 | Zhao | H04W 72/044 |
| 2021/0212117 A1* | 7/2021 | Chae | H04W 72/02 |
| 2021/0314991 A1* | 10/2021 | Tenny | H04W 4/40 |
| 2021/0345184 A1* | 11/2021 | Sarkis | H04W 28/26 |
| 2022/0232528 A1* | 7/2022 | Sartori | H04W 4/40 |
| 2022/0346118 A1* | 10/2022 | Wu | H04L 5/0044 |
| 2022/0386284 A1* | 12/2022 | Zhao | H04W 72/51 |
| 2022/0394613 A1* | 12/2022 | Kwon | H04W 72/51 |

FOREIGN PATENT DOCUMENTS

| | | |
|---|---|---|
| WO | 2020033381 A1 | 2/2020 |
| WO | 2020060276 A1 | 3/2020 |

OTHER PUBLICATIONS

3GPP TS 38.214 V1.0.0, "3rd Generation Partnership Project; Technical Specification Group Radio Access Network; NR; Physical layer procedures for data (Release 15)," Sep. 2017, 32 pages.

3GPP TS 38.321 V0.0.3, "3rd Generation Partnership Project; Technical Specification Group Radio Access Network; NR; Medium Access Control (MAC) protocol specification (Release 15)," May 2017, total 20 pages.

* cited by examiner

RESOURCE DETERMINING METHOD AND APPARATUS

CROSS-REFERENCE TO RELATED APPLICATIONS

This application is a National Stage of International Application No. PCT/CN2021/090206, filed on Apr. 27, 2021, which claims priority to Chinese Patent Application No. 202010342264.0, filed on Apr. 27, 2020, both of which are hereby incorporated by reference in their entireties.

TECHNICAL FIELD

This application relates to the mobile communication field, and in particular, to a resource determining method and an apparatus.

BACKGROUND

Currently, in communication scenarios such as vehicle to vehicle (vehicle to vehicle, V2V) and vehicle to everything (vehicle to everything, V2X) that use a sidelink (sidelink, SL) transmission (or referred to as sidelink transmission) technology, in consideration of power consumption, user equipments (user equipments, UEs) that perform SL communication usually uses different resource obtaining manners. For example, some UEs can actively select resources used for sidelink transmission, and some UEs cannot actively select resources used for sidelink transmission.

To meet requirements of different types of UEs for sidelink transmission, it is necessary to refine and improve a manner in which a UE determines a resource used for sidelink transmission.

SUMMARY

This application provides a resource determining method and an apparatus, to meet requirements of different types of UEs for sidelink transmission.

According to a first aspect, an embodiment of this application provides a resource determining method. The method may be performed by a first communication apparatus or may be performed by a component (such as a processor, a chip, or a chip system) of the first communication apparatus. The first communication apparatus may be a UE that supports sidelink transmission.

The following is described by using an example in which an execution body is the first communication apparatus. According to the method, the first communication apparatus may obtain first resource information, and determine a transmission resource based on a type of the first communication apparatus and the first resource information. The first communication apparatus transmits sidelink transmission data by using the transmission resource. The first resource information may be used to indicate a first-type resource and/or a second-type resource. The first-type resource is a resource whose signal strength is not less than (or greater than) a first threshold or whose usage is not less than (or greater than) a second threshold. The second-type resource is a resource whose signal strength is not greater than (or less than) a third threshold or whose usage is not greater than (or less than) a fourth threshold.

According to the foregoing method, the first communication apparatus may determine the transmission resource based on the type of the first communication apparatus and a resource indicated by the first resource information, and perform sidelink transmission by using the transmission resource. The first resource information may indicate high-interference or high-usage resources (that is, non-preferred resources), so that the first communication apparatus considers avoiding these resources to select the transmission resource. The first resource information may also indicate low-interference or low-usage resources (that is, preferred resources), so that the first communication apparatus considers selecting these resources. Therefore, the first communication apparatus can select, based on the type of the first communication apparatus, a resource with relatively low interference to perform sidelink transmission. This improves sidelink transmission performance.

In a possible design, the first communication apparatus may receive the first resource information from a third communication apparatus. The third communication apparatus may be a network device (such as a base station) or a user equipment (such as a leader UE or a roadside processing unit). The first resource information may be sent to the first communication apparatus in a process in which the first communication apparatus initially accesses the third communication apparatus. The access herein may be a process in which the UE accesses the network device, a process in which a member UE accesses the leader UE, or a process in which the UE accesses the roadside processing unit. According to this design, the third communication apparatus may obtain the first resource information from the third communication apparatus, so that the third communication apparatus configures and manages the resource information. This avoids a resource conflict caused by resource selection by the UE, and further reduces interference to sidelink transmission performed by the first communication apparatus.

The first resource information is related to a location of the first communication apparatus. Specifically, the first resource information is determined based on location information of the first communication apparatus.

In a possible design, the type of the first communication apparatus is a no-sensing type, a partial-sensing type, or a full-sensing type. For example, a UE of the no-sensing type does not sense data transmitted by a surrounding UE, and a UE of the partial-sensing type can sense data transmitted by some surrounding UEs. This type of UE receives the first resource information sent by the base station, so that a resource conflict in data transmission can be reduced, and transmission performance is further improved. Therefore, the transmission resource may be determined in different manners for different types of UEs, to reduce interference to sidelink transmission performed by the different types of UEs.

In a possible design, the first resource information may come from a second communication apparatus. The first communication apparatus may determine the transmission resource based on the first resource information, and send the sidelink transmission data to the second communication apparatus based on the transmission resource. According to this design, interference received when the first communication apparatus sends the sidelink transmission data to the second communication apparatus can be further reduced, and transmission performance can be improved.

In a possible design, if the first communication apparatus determines that the type of the first communication apparatus is the no-sensing type, the first communication apparatus may select the transmission resource based on the second-type resource or a resource other than the first-type resource. For example, the second-type resource or a resource other than the first-type resource is used as the transmission resource. In this manner, even if the type of the first communication apparatus is the no-sensing type, or the first communication apparatus is not required to have a sensing capability, the first communication apparatus obtains the preferred resource from the third communication apparatus (for example, the network device), to avoid a resource congestion problem.

In a possible design, if the first communication apparatus determines that the type of the first communication apparatus is the partial-sensing type or the full-sensing type, the first communication apparatus may determine a resource pool, and select the transmission resource from the second-type resource or the resource other than the first-type resource in the resource pool. A resource in the resource pool is used by the first communication apparatus to perform sidelink transmission. For example, the second-type resource or the resource other than the first-type resource in the resource pool is used as the transmission resource. In this manner, a partial-sensing UE can obtain the preferred resource from the network device. Therefore, a resource congestion problem of the partial-sensing UE in a time range outside a sensing window can be avoided. In addition, the third communication apparatus (for example, the network device) indicates resource information, so that the partial-sensing UE can better select the transmission resource, to further reduce interference to sidelink transmission of the first communication apparatus. In addition, in this solution, the third communication apparatus (for example, the network device) indicates the resource information, so that the first communication apparatus of the full-sensing type can better select the transmission resource, or the first communication apparatus of the full-sensing type can properly reduce resource sensing, and determine the transmission resource based on the resource information indicated by the third communication apparatus, to avoid the resource congestion problem and reduce power consumption.

In a possible design, if the first communication apparatus determines that the type of the first communication apparatus is the partial-sensing type or the full-sensing type, and the first resource information indicates the second-type resource, the first communication apparatus may sense the second-type resource, obtain signal strength or usage of the second-type resource, and determine the transmission resource from the second-type resource based on a sensing result. For example, a resource with minimum signal strength or lowest usage is selected as the transmission resource based on signal strength or usage of each of a plurality of second-type resources. In this manner, the first communication apparatus can select the transmission resource from the second-type resource based on the first resource information and the sensing result obtained by the first communication apparatus, to further reduce interference received when the selected transmission resource is used to send the sidelink transmission data.

In a possible design, if the first communication apparatus determines that the type of the first communication apparatus is the partial-sensing type or the full-sensing type, and the first resource information indicates the first-type resource, the first communication apparatus may sense signal strength or usage of a resource other than the first resource, and determine, based on a sensing result, the transmission resource from the resource other than the first resource. The resource other than the first resource may be the resource other than the first resource in the resource pool. For example, a resource with minimum signal strength or lowest usage is selected as the transmission resource based on signal strength or usage of each resource in a plurality of resources other than the first-type resource. In this manner, the first communication apparatus can select the transmission resource from the resource other than the first-type resource based on the first resource information and the sensing result obtained by the first communication apparatus, to further reduce interference received when the selected transmission resource is used to send the sidelink transmission data. In addition, in this manner, the first-type resource does not need to be sensed, thereby reducing power consumption.

In a possible design, if the first communication apparatus determines that the type of the first communication apparatus is the partial-sensing type or the full-sensing type, and the first resource information indicates the first-type resource, the first communication apparatus may obtain the resources in the resource pool of the first communication apparatus. The resources in the resource pool of the first communication apparatus include the first-type resource. The first communication apparatus may further sense signal strength of the resources in the resource pool of the first communication apparatus and priorities of data transmitted by using the resources. Then, the first communication apparatus may determine a first signal strength threshold for the first-type resource based on a priority of the sidelink transmission data and a priority of data transmitted by using the first-type resource. The first communication apparatus further determines a second signal strength threshold for the first-type resource based on the first resource information. The second signal strength threshold is less than the first signal strength threshold for the first-type resource. The first communication apparatus may further determine, based on the second signal strength threshold and the signal strength of the first-type resource, whether to use the first-type resource as a candidate resource. The candidate resource is used to determine the transmission resource. Subsequently, the first communication apparatus may determine the transmission resource from the candidate resource. According to this design, the first communication apparatus may select the transmission resource based on the sensing result, where a non-preferred resource indicated by the first resource information is less likely to be determined as the transmission resource, to reduce interference received by the first communication apparatus in a sidelink transmission process. In addition, in this manner, the finally selected transmission resource may still be the first-type resource indicated by the first resource information. Therefore, a possibility of sidelink data transmission by using the first-type resource is not excluded, to improve a transmission success rate. In addition, the first communication apparatus no longer senses the first-type resource, so that power consumption can be reduced.

In a possible design, if the first communication apparatus determines that the type of the first communication apparatus is the partial-sensing type or the full-sensing type, and the first resource information indicates the second-type resource, the first communication apparatus may obtain the resources in the resource pool of the first communication apparatus. The resources in the resource pool of the first communication apparatus include the second-type resource. Then, the first communication apparatus may sense signal strength of the resources in the resource pool of the first communication apparatus and priorities of data transmitted by using the resources, and determine a first signal strength threshold for the second-type resource based on a priority of the sidelink transmission data and a priority of data transmitted by using the sensed second-type resource. Then, the first communication apparatus determines a second signal strength threshold for the second-type resource based on the first resource information. The second signal strength threshold is less than the first signal strength threshold for the second-type resource. Further, the first communication apparatus may determine, based on the second signal strength threshold and the signal strength of the second-type resource, whether to use the second-type resource as a candidate resource. The candidate resource is used to determine the transmission resource. Subsequently, the first communication apparatus may determine the transmission resource from the candidate resource. In this manner, the first communication apparatus can select the transmission resource based on the sensing result of each resource in the resource pool and the preferred resource indicated by the first resource information. A condition for selecting the preferred resource indicated by the first resource information as the transmission resource is relaxed. In other words, the preferred resource indicated by the first resource information is more likely to be selected as the resource, to reduce interference received by the first communication apparatus in a sidelink transmission process.

In a possible design, if the first communication apparatus determines that the type of the first communication apparatus is the partial-sensing type or the full-sensing type, and the first resource information indicates the first-type resource and the second-type resource, the first communication apparatus may obtain the resources in the resource pool of the first communication apparatus. The resources in the resource pool of the first communication apparatus include the first-type resource and the second-type resource. The first communication apparatus may further sense signal strength of the resources in the resource pool of the first communication apparatus and priorities of data transmitted by using the resources, determine a first signal strength threshold for the first-type resource based on a priority of the sidelink transmission data and a priority of data transmitted by using the first-type resource, and determine a first signal strength threshold for the second-type resource based on the priority of the sidelink transmission data and a priority of data transmitted by using the second-type resource. Then, the first communication apparatus determines a second signal strength threshold for the first-type resource and a second signal strength threshold for the second-type resource based on the first resource information. The second signal strength threshold for the first-type resource is less than the first signal strength threshold for the first-type resource, and the second signal strength threshold for the second-type resource is less than the second signal strength threshold for the second-type resource. Further, the first communication apparatus may determine, based on the second signal strength threshold for the first-type resource and the signal strength of the first-type resource, whether to use the first-type resource as a candidate resource; and determine, based on the second signal strength threshold for the second-type resource and the signal strength of the second-type resource, whether to use the second-type resource as the candidate resource. The candidate resource is used to determine the transmission resource. Then, the first communication apparatus may determine the transmission resource from all candidate resources.

In this manner, the transmission resource can be selected based on the sensing result of each resource in the resource pool and the preferred resource and the non-preferred resource that are indicated by the first resource information. A condition for selecting the preferred resource indicated by the first resource information as the transmission resource is relaxed, and a condition for selecting the non-preferred resource as the transmission resource is limited, to reduce interference received by the first communication apparatus in a sidelink transmission process. In addition, in this manner, the finally selected transmission resource may still be the first-type resource indicated by the first resource information.

In a possible design, if the first communication apparatus determines that the type of the first communication apparatus is the partial-sensing type or the full-sensing type, and the first resource information indicates the first-type resource and the second-type resource, the first communication apparatus may obtain the resource other than the first-type resource in the resource pool of the first communication apparatus. The resource other than the first-type resource in the resource pool includes the second-type resource. The first communication apparatus may sense signal strength of the resource other than the first-type resource in the resource pool and a priority of data transmitted by using the resource, and determine a first signal strength threshold for the second-type resource based on a priority of the sidelink transmission data and a priority of data transmitted by using the second-type resource. Then, the first communication apparatus may determine a second signal strength threshold for the second-type resource based on the first resource information. The second signal strength threshold is less than the first signal strength threshold for the second-type resource. The first communication apparatus may further determine, based on the second signal strength threshold and the signal strength of the second-type resource, whether to use the second-type resource as a candidate resource. The candidate resource is used to determine the transmission resource. Then, the first communication apparatus may determine the transmission resource from the candidate resource.

In this manner, the transmission resource can be selected from the resource other than the first resource in the resource pool based on the first resource information and the sensing result of each resource other than the first resource in the resource pool and the preferred resource indicated by the first resource information. A condition for selecting the preferred resource indicated by the first resource information as the transmission resource is relaxed, and the non-preferred resource is not selected as the transmission resource, to reduce interference received by the first communication apparatus in a sidelink transmission process. In addition, in this manner, the first communication apparatus no longer needs to sense the first-type resource, so as to reduce power consumption.

According to a second aspect, this application provides a resource determining method. The method may be performed by a third communication apparatus, or may be performed by a component (such as a processor, a chip, or a chip system) of the third communication apparatus. The third communication apparatus may be a base station such as a gNB.

The following is described by using an example in which an execution body is the third communication apparatus. According to the method, the third communication apparatus may determine a first-type resource and/or a second-type resource based on location information of a first communication apparatus. Further, the third communication apparatus may send first resource information to the first communication apparatus. The first resource information is used to indicate the first-type resource and/or the second-type resource. Signal strength of the first-type resource is not less than (or greater than) a first threshold, and/or usage of the first-type resource is not less than (or greater than) a second threshold. Signal strength of the second-type resource is not greater than (or less than) a third threshold, and/or usage of the second-type resource is not greater than (or less than) a fourth threshold.

According to the foregoing method, the third communication apparatus may indicate the first resource information to the first communication apparatus, so that the first communication apparatus selects a transmission resource not from the first-type resource or selects a transmission resource from the second-type resource based on the first resource information, to improve sidelink transmission performance of the first communication apparatus.

In a possible design, the third communication apparatus may obtain a first correspondence, and determine, based on the first correspondence and location information of the first communication apparatus, the first-type resource and/or the second-type resource corresponding to the location information of the first communication apparatus. The first correspondence includes a correspondence between location information and the first-type resource and/or the second-type resource. That the third communication apparatus obtains the first correspondence may include: The third communication apparatus obtains the first correspondence stored in a memory, or the third communication apparatus receives the first correspondence from another communication apparatus (for example, another base station other than the third communication apparatus). According to this design, efficiency of determining a resource related to the first communication apparatus can be improved.

In a possible design, the third communication apparatus may obtain first information from a fourth communication apparatus, and obtain location information of the fourth communication apparatus. The fourth communication apparatus may be a user equipment of a partial-sensing type or full-sensing type within coverage of the third communication apparatus. The first information is used to indicate the first-type resource and/or the second-type resource determined by the fourth communication apparatus. The third communication apparatus may determine the first correspondence based on the first-type resource or the second-type resource determined by the fourth communication apparatus and the location information of the fourth communication apparatus, to provide a more accurate resource indication.

In a possible design, the first information may be sent in a process in which the fourth communication apparatus initially accesses the third communication apparatus, or may be sent according to a first periodicity, or the third communication apparatus may send second information to the fourth communication apparatus, to request to obtain the first information, so as to improve time validity of the first resource information.

In a possible design, the first resource information may be sent in a process in which the first communication apparatus initially accesses the third communication apparatus, or may be sent according to a second periodicity, or may be sent after the third communication apparatus determines that the location information of the first communication apparatus changes, or the third communication apparatus may send the first resource information in response to third information from the first communication apparatus. The third information may be used to request the first resource information, to improve time validity of the first resource information.

According to a third aspect, an embodiment of this application provides an apparatus, to implement the method in any one of the first aspect or the possible implementations of the first aspect. The apparatus includes a corresponding unit or component configured to perform the foregoing method. The unit included in the apparatus may be implemented by software and/or hardware. The apparatus may be, for example, a terminal device, or a chip, a chip system, or a processor that can support the terminal device in implementing the foregoing method.

According to a fourth aspect, an embodiment of this application provides an apparatus, including a processor. The processor is coupled to a memory, the memory is configured to store a program or instructions, and when the program or the instructions are executed by the processor, the apparatus is enabled to implement the method in any one of the first aspect or the possible implementations of the first aspect.

According to a fifth aspect, an embodiment of this application provides an apparatus, to implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a terminal device, or a chip, a chip system, or a processor that can support the terminal device in implementing the foregoing method.

According to a sixth aspect, an embodiment of this application provides an apparatus, including a processor. The processor is coupled to a memory, the memory is configured to store a program or instructions, and when the program or the instructions are executed by the processor, the apparatus is enabled to implement the method in any one of the second aspect or the possible implementations of the second aspect.

According to a seventh aspect, an embodiment of this application provides a communication system. The communication system may include the communication apparatus in the third aspect or the fourth aspect, and include the communication apparatus in the fifth aspect or the sixth aspect.

According to an eighth aspect, an embodiment of this application provides a computer-readable medium. The computer-readable medium stores a computer program or instructions, and when the computer program or the instructions are executed, a computer is enabled to perform the method in any one of the first aspect or the possible implementations of the first aspect.

According to a ninth aspect, an embodiment of this application provides a computer program product. The computer program product includes computer program code. When the computer program code is run on a computer, the computer is enabled to perform the method in any one of the first aspect or the possible implementations of the first aspect.

According to a tenth aspect, an embodiment of this application provides a chip, including a processor. The processor is coupled to a memory, the memory is configured to store a program or instructions, and when the program or the instructions are executed by the processor, the chip is enabled to implement the method in any one of the first aspect or the possible implementations of the first aspect.

For technical effects that can be achieved in the second aspect to the tenth aspect, refer to the foregoing analysis and description of the first aspect and the possible designs of the first aspect. Details are not described herein again.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment.

Figure 1:
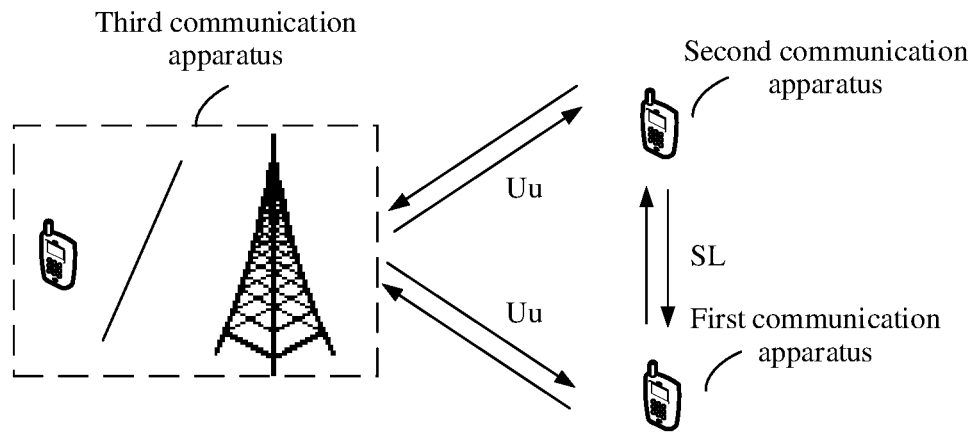
FIG. 1 is a schematic diagram of an architecture of a communication system according to an embodiment of this application.

A resource determining method provided in embodiments of this application may be applied to the communication scenario shown in FIG. 1. FIG. 1 shows communication devices in a sidelink transmission scenario. Specifically, the communication devices may include a user equipment and a network device. For example, a first communication apparatus and/or a second communication apparatus each shown in FIG. 1 may be a user equipment, and a third communication apparatus may be a network device.

As shown in FIG. 1, a wireless communication system 100 provided in an embodiment of this application includes the first communication apparatus, the second communication apparatus, and the third communication apparatus. An application scenario of the wireless communication system 100 includes but is not limited to a long term evolution (long term evolution, LTE) system, a future 5th generation (5th generation, 5G) system, a new radio (new radio, NR) communication system, an NR Internet of Vehicles system, a future Internet of Vehicles system based on mobile communication, or the like. It should be understood that the wireless communication system 100 provided in this embodiment of this application is applicable to both a low-frequency scenario (sub 6G) and a high-frequency scenario (above 6G).

For example, the first communication apparatus and/or the second communication apparatus may be a device such as a terminal (terminal), a mobile station (mobile station, MS), or a mobile terminal (mobile terminal), or an apparatus such as a chip or a chip system. The first communication apparatus and/or the second communication apparatus can communicate with one or more network devices in one or more communication systems, and receive a network service provided by the network device. The network device herein includes but is not limited to the third communication apparatus shown in the figure. For example, the first communication apparatus and/or the second communication apparatus in this embodiment of this application may be a mobile phone (or referred to as a "cellular" phone), a computer having a mobile terminal, a smart vehicle, an Internet of Vehicles-related smart device (for example, a smart street lamp), a wearable device, or the like. Alternatively, the first communication apparatus and/or the second communication apparatus may be a portable, pocket-sized, handheld, computer built-in, or in-vehicle mobile apparatus. The first communication apparatus and the second communication apparatus may also be communication chips having communication modules. It should be understood that the first communication apparatus and/or the second communication apparatus may be configured to support communication with a network device including the third communication apparatus through a universal user to network interface (universal user to network interface, Uu air interface). In addition, the first communication apparatus and the second communication apparatus may be configured to support sidelink transmission. For example, sidelink communication may be performed between the first communication apparatus and the second communication apparatus through a direct communication (PC5) air interface. The first communication apparatus and/or the second communication apparatus may be a chip having a communication module or a chip that can be connected to a communication module, for example, a chip in a vehicle-mounted device.

The third communication apparatus may include a network device. The network device may include a base station (base station, BS), or include a base station, a radio resource management device configured to control the base station, and the like. The base station herein may be an evolved NodeB (evolutional NodeB, eNB or eNodeB), a small cell (micro/pico eNB), or a transmission/reception point (transmission/reception point, TRP) in an LTE system, or may be a radio controller in a cloud radio access network (cloud radio access network, CRAN) scenario. Alternatively, the third communication apparatus may be a relay station, an access point, a wearable device, and a base station in a future 5G network or a base station in a future evolved PLMN network, for example, a next-generation node B (generated node B, gNB). This is not limited in this embodiment of this application. Alternatively, the third communication apparatus may be a chip having a communication module or a chip that can be connected to a communication module, for example, a chip in a base station.

It should be understood that in this application, the third communication apparatus may support Uu interface communication, for example, support access of the first communication apparatus through the Uu interface.

In addition, the third communication apparatus may also include a user equipment. For example, the third communication apparatus may include a leader UE (or referred to as a platform UE) in a group communication scenario. The leader UE may be configured to manage one or more member UEs (for example, the first communication apparatus) that access the leader UE. The leader UE may perform group communication with the one or more member UEs. For example, the leader UE may send road information and group management information to the member UEs. In addition, the third communication apparatus may alternatively be a roadside processing unit (or a roadside processing UE), for example, a user equipment in a form of a smart street lamp or an intersection management unit. The roadside processing unit may manage a UE (for example, the first communication apparatus) that accesses the roadside processing unit, for example, send some road information and management information to the UE. In this example, the third communication apparatus may perform SL communication with the first communication apparatus.

Based on the architecture shown in FIG. 1, the third communication apparatus may be adapted to configure SL data transmission between the first communication apparatus and the second communication apparatus. For example, the third communication apparatus may perform SL grant (SL grant) for the first communication apparatus and the second communication apparatus through the Uu air interface, and separately configure a resource pool for the first communication apparatus and the second communication apparatus, so that SL data transmission is performed between the first communication apparatus and the second communication apparatus by using a resource in the resource pool.

For example, the third communication apparatus is a network device (such as a gNB). An application scenario of the wireless communication system 100 provided in this embodiment of this application is shown in FIG. 2.

Figure 2:
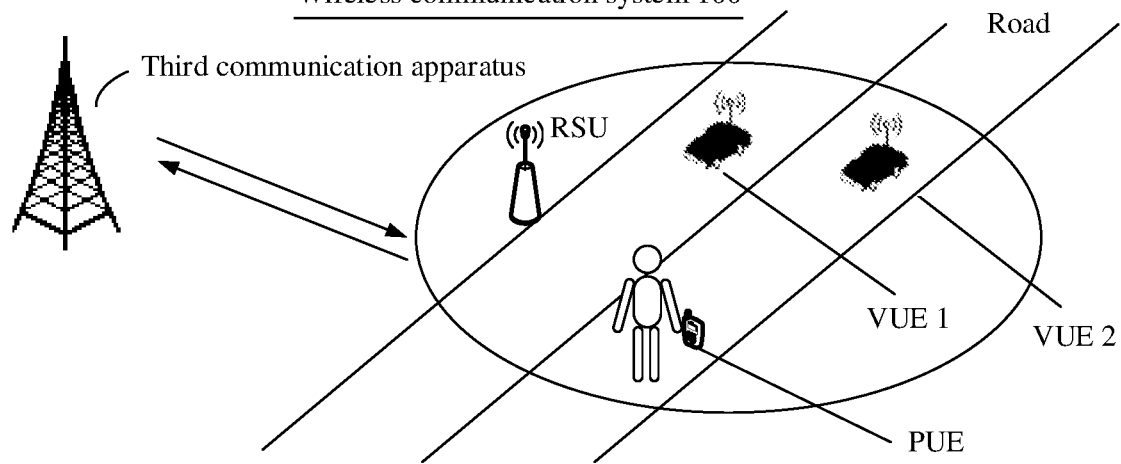
FIG. 2 is a schematic diagram of another architecture of a communication system according to an embodiment of this application.

An elliptical dashed line shown in FIG. 2 is schematic coverage of the network device. For example, if the third communication apparatus is a network device, the dashed line may represent a range of one or more cells of the network device. It can be learned that in a V2X scenario, there may be a plurality of types of user equipments within coverage of one network device. These user equipments include but are not limited to a first communication apparatus and a second communication apparatus. For example, these user equipments are of types such as a vehicle terminal (vehicle user/vehicle UE, VUE) and a vulnerable roadside device (vulnerable road user/unit, VRU). The VRU may include a person terminal (person user/person UE, PUE), a road side unit (road side unit, RSU), a smart street lamp, and the like. These UEs may be classified into a full-sensing type, a partial-sensing (partial-sensing) type, or a no-sensing (no-sensing) type based on different power continuity capabilities and real-time communication requirements.

The UE of the no-sensing type does not sense data sent by another UE, that is, the UE of the no-sensing type cannot obtain, based on the data sent by the another UE, a channel used by the another UE for transmission. The UE of the no-sensing type may randomly select a resource from a configured resource pool for transmission, and may conflict with a transmission resource used by the another UE for transmission. As a result, transmission of the another UE is interfered, and transmission of the UE is interfered.

The partial-sensing type means that the UE may perform sensing in a short time window (which may be referred to as a sensing window), that is, receive, in the short time window, data transmitted by another UE, and can obtain, based on the data, a priority of data transmitted by the another UE, information of a resource used for data transmission, and the like. Therefore, in the sensing window, the UE of the partial-sensing type can learn of a resource used by a nearby UE. This can avoid data transmission on a resource on which data transmission is sensed, and can reduce transmission interference to some extent. However, in a time period outside the sensing window, transmission interference cannot be reduced. Consequently, the UE can implement low-interference transmission only in a short window, and transmission performance is limited.

The full-sensing type means that the UE may continuously receive data transmitted by another UE, and a time window for receiving the data covers an entire range of a service periodicity. Therefore, the UE more accurately learns, based on the received data, a resource used by a nearby UE, to avoid data transmission on a resource on which data transmission is sensed.

For example, vehicle to infrastructure (vehicle to infrastructure, V2I) communication may be implemented between the RSU and the VUE or between the RSU and the PUE. For example, the RSU may be configured to notify the VUE and the PUE of traffic road condition information and the like. V2V communication may be implemented between the VUE (or the PUE) and the VUE (or the PUE). The VUE is generally deployed on a vehicle, for example, may be a vehicle-mounted device or another terminal device deployed on the vehicle. The PUE may be UE carried by a pedestrian, for example, a mobile apparatus such as a mobile phone. RSUs are usually deployed on one or both sides of a road.

Currently, in order to save costs of a receiving circuit, the PUE and the VRU may be of the no-sensing type. In addition, for the PUE and the VRU that use solar power supply, battery power supply, or the like and that cannot continuously obtain power, unlike the VUE that can continuously obtain power from a vehicle, a partial-sensing solution is required to save power and prolong a service life of a device. The UE of the full-sensing type such as the VUE needs to receive, on all subframes or all resources, data transmitted by a surrounding UE. The data may be used by the UE to learn of a location of another UE and learn of a resource used by the another UE for data transmission. The UE of the partial-sensing type only needs to receive, on a part of subframes or a part of resources, data transmitted by a surrounding UE, to learn of a location of another UE and learn of a resource used by the another UE for data transmission. The UE of the no-sensing type does not receive data transmitted by a surrounding UE.

In addition, the VUE shown in FIG. 2 is generally a vehicle-mounted device such as an in-vehicle communication unit. It may be considered that the VUE can obtain power by using a vehicle, and does not need to use a sensing capability of no-sensing or partial-sensing to reduce power consumption. Therefore, the VUE is generally of a sensing type, that is, continuously receives data transmitted by a surrounding terminal in a service periodicity. In addition, the VRU connected to the power supply may also take full sensing. Compared with the UE of the no-sensing type or the UE of the partial-sensing type, the UE of the full-sensing type can learn of all data sent by other surrounding UEs in the service periodicity, and therefore can learn of an interference status of a surrounding resource and learn of a location of a nearby UE.

Because a current V2X service is a periodic service, the UE of the partial-sensing type or full-sensing type may learn of a complete interference status of a resource in a service periodicity based on a sensing result in a previous service periodicity, and search for a resource with relatively low interference in the service periodicity (for example, search for a resource whose interference is not greater than or less than a specific threshold), so as to select these resources in a next service periodicity, and perform transmission by using the resource with relatively low interference. Specifically, the sensing result may be represented by information such as signal strength (which may be subsequently referred to as signal strength of a resource) of a received signal of another UE on a resource or usage of the resource that is sensed by the UE. For example, when the UE senses that signal strength of a resource X is relatively large, it indicates that another UE performs data transmission on the resource X. If the UE still performs sidelink transmission by using the resource X, the UE may receive relatively large signal interference.

Figure 3:
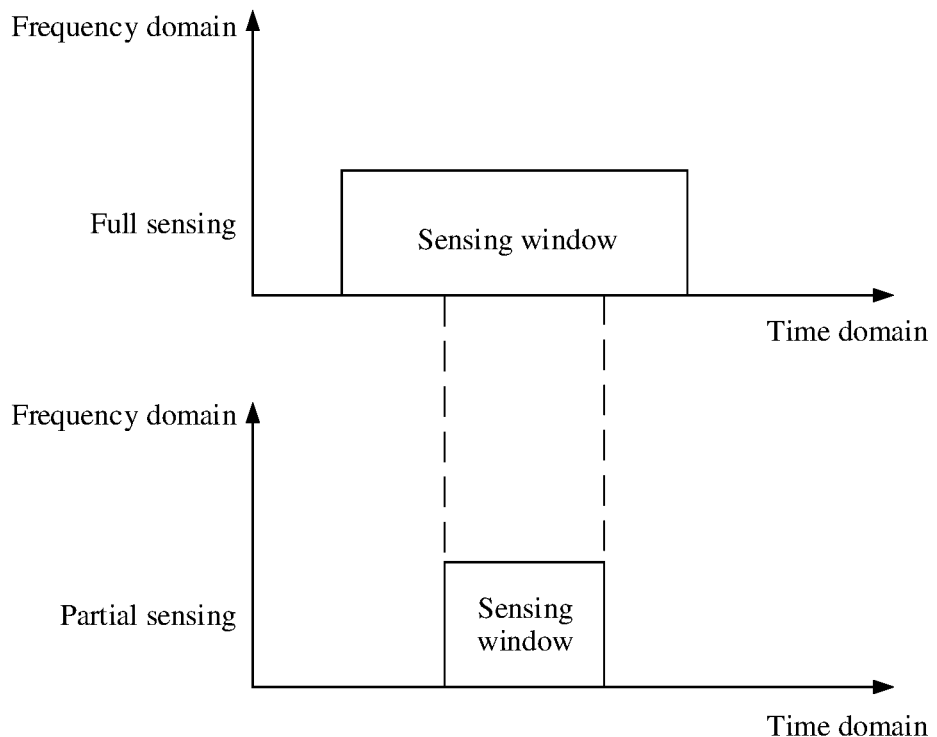
FIG. 3 is a schematic diagram of a sensing window according to an embodiment of this application.

For example, as shown in FIG. 3, compared with the UE of the full-sensing type, the UE of the partial-sensing type performs sensing only in a smaller sensing window, and obtains a resource used by another UE to transmit data. Therefore, compared with the UE of the full-sensing type, the UE of the partial-sensing type can select a transmission resource with low interference only in a shorter time period.

If data is transmitted in another time period outside the sensing window, the UE of the partial-sensing type cannot select the transmission resource with low interference. In addition, the UE of the no-sensing type does not sense a resource, and therefore cannot select the transmission resource with low interference for sidelink transmission.

It can be learned based on the foregoing content that currently, manners of selecting resources used for sidelink transmission by different types of UEs are different. In some cases, the UE still selects a resource with high interference or high usage for transmission. As a result, sidelink transmission quality is not high. Therefore, a current process of determining a sidelink transmission resource still needs to be optimized. To optimize a sidelink resource selection process, so that sidelink transmission performance meets transmission requirements of different types of UEs, an embodiment of this application provides a resource determining method.

The method may be implemented by the first communication apparatus, the third communication apparatus, and the like shown in FIG. 1. For example, the first communication apparatus and the second communication apparatus may be a UE or a chip in the UE, and sidelink transmission may be performed between the first communication apparatus and the second communication apparatus. The first communication apparatus accesses the third communication apparatus. The third communication apparatus may be a network device such as a base station, a UE such as a leader UE or a roadside processing unit in a group communication scenario, or a chip in a network device or a UE. In addition, the method may also be performed by a second communication apparatus. Specifically, the first communication apparatus is located within coverage of the third communication apparatus, and the second communication apparatus may be a user equipment within or outside the coverage of the third communication apparatus.

The method may be specifically applied to a scenario in which the first communication apparatus performs sidelink transmission to the second communication apparatus (or another communication apparatus). For example, in a scenario in which the first communication apparatus sends traffic information, location information, or other data to the second communication apparatus through sidelink transmission, the first communication apparatus may determine, based on the resource determining method provided in this embodiment of this application, a sidelink transmission resource.

Figure 4:
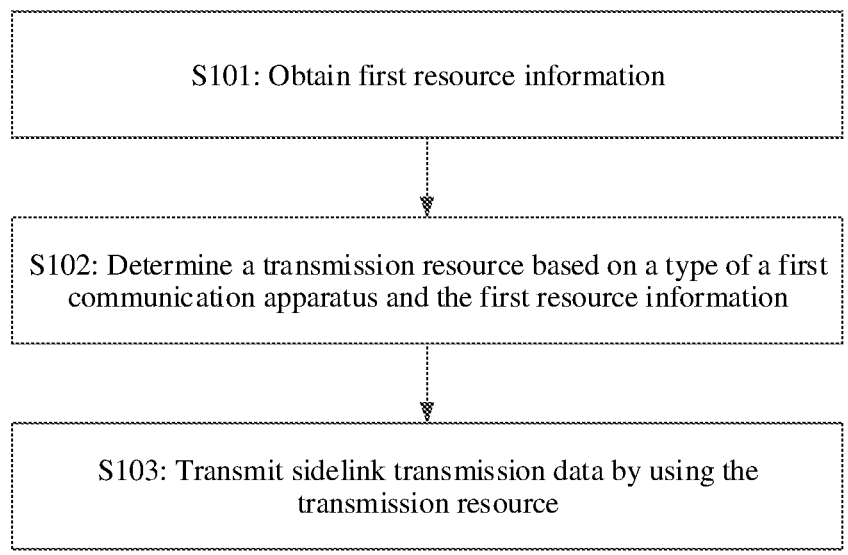
FIG. 4 is a schematic flowchart of a communication method according to an embodiment of this application.

As shown in FIG. 4, the resource determining method provided in this embodiment of this application may include the following steps.

S101: A first communication apparatus obtains first resource information.

The first resource information is used to indicate a resource related to the first communication apparatus. The resource related to the first communication apparatus may include a first-type resource and/or a second-type resource. The first-type resource may include one or more resources, and each resource meets: signal strength (unit: decibel (dB)) is not less than (or greater than) a first threshold, usage is not less than (or greater than) a second threshold, or signal strength is not less than (or greater than) a first threshold and usage is not less than (or greater than) a second threshold. In other words, the first-type resource may include a high-interference resource and/or a high-usage resource. Therefore, the first communication apparatus receives relatively strong transmission interference if transmitting data on the first-type resource.

The second-type resource may include one or more resources, and each resource meets: signal strength is not greater than (or less than) a third threshold, usage is not greater than (or less than) a fourth threshold, or signal strength is not greater than (or less than) a third threshold and usage is not greater than (or less than) a fourth threshold. The second-type resource may include a low-interference resource and/or a low-usage resource. Therefore, the first communication apparatus receives relatively low transmission interference if transmitting data on the second-type resource.

In addition, the first-type resource may also be referred to as a non-preferred resource, and the second-type resource may also be referred to as a preferred resource.

The signal strength of the first-type resource and the second-type resource may refer to signal strength of a received signal on a resource obtained by a UE having a sensing capability (including a UE of a partial-sensing type or full-sensing type) by sensing the resource. Larger signal strength indicates stronger interference received by the first communication apparatus when performing sidelink transmission on the resource.

For example, the first-type resource and/or the second-type resource may be included in a resource pool for the first communication apparatus. The resource pool may be configured by a network device (for example, a third communication apparatus).

The first resource information may carry information about the first-type resource, including an index, time domain location information, frequency domain location information, and the like of the first-type resource. The first resource information may carry information about the second-type resource, including an index, time domain location information, frequency domain location information, and the like of the second-type resource. Alternatively, the first resource information may carry related information about both the first-type resource and the second resource.

S102: The first communication apparatus determines a transmission resource based on a type of the first communication apparatus and the first resource information.

The type of the first communication apparatus is a no-sensing type, a partial-sensing type, or a full-sensing type. In other words, the type of the first communication apparatus is determined based on a sensing capability configuration of the first communication apparatus.

Specifically, if the first resource information indicates the non-preferred resource such as the first-type resource (that is, the high-interference resource or the high-usage resource), the first communication apparatus may select not to use the first-type resource, and selects another resource for sidelink transmission. If the first resource information indicates the preferred resource such as the second-type resource (that is, the high-interference resource or the high-usage resource), the first communication apparatus selects a resource from the second-type resource for sidelink transmission.

For example, if the type of the first communication apparatus is the no-sensing type, and the first resource information is used to indicate the first-type resource, the first communication apparatus may use another resource (the another resource is, for example, a transmission resource other than the first resource in the resource pool) other than the first-type resource for sidelink transmission. If the type of the first communication apparatus is the no-sensing type, and the first resource information is used to indicate the second-type resource, the first communication apparatus may select a resource from the second-type resource for sidelink transmission.

In addition, if the type of the first communication apparatus is the partial-sensing type or the full-sensing type, and the first resource information is used to indicate the first-type resource, the first communication apparatus may select, based on sensing results of all resources in the resource pool or sensing results of transmission resources other than the first-type resource in the resource pool, a resource for sidelink transmission. If the type of the first communication apparatus is the partial-sensing type or the full-sensing type, and the first resource information is used to indicate the second-type resource, the first communication apparatus may select, based on sensing results of all resources in the resource pool or a sensing result of the second-type resource, a resource for sidelink transmission. If the type of the first communication apparatus is the partial-sensing type or the full-sensing type, and the first resource information is used to indicate the first-type resource and the second-type resource, the first communication apparatus may select, based on sensing results of all resources in the resource pool, sensing results of resources other than the first-type resource in the resource pool, or a sensing result of the second-type resource, a resource for sidelink transmission.

S103: The first communication apparatus transmits sidelink transmission data by using the transmission resource.

For example, the first communication apparatus may send the sidelink transmission data by using the transmission resource. For example, the first communication apparatus sends the sidelink transmission data to the second communication apparatus shown in FIG. 1.

According to the foregoing method, the first communication apparatus may determine the transmission resource based on the type of the first communication apparatus and the first resource information. The first resource information can indicate the preferred resource or the non-preferred resource, so that the first communication apparatus avoids the non-preferred resource to select the transmission resource, and/or the first communication apparatus selects the preferred resource as the transmission resource. Therefore, the first communication apparatus can select a resource with relatively low interference for sidelink transmission, to reduce interference to sidelink transmission and improve transmission performance.

In an implementation of S101, the first communication apparatus may obtain the first resource information from the third communication apparatus shown in FIG. 1.

For example, the third communication apparatus may determine, based on location information of the first communication apparatus, a resource related to the first communication apparatus, and send the first resource information to the first communication apparatus, to indicate the resource related to the first communication apparatus.

The location information of the first communication apparatus may be specifically information such as latitude and longitude information or a zone identifier (zone ID) of the first communication apparatus. The zone identifier may be used to indicate a zone in which the first communication apparatus is currently located. There is an association relationship between the zone identifier and the longitude and latitude information. For example, longitude and latitude information within a specific range (for example, 100 square meters or another range) is corresponding to a same zone identifier.

For example, before S101, the first communication apparatus may send the location information of the first communication apparatus to the third communication apparatus. That the location information is related to the first resource information may be specifically reflected as that the third communication apparatus determines the first resource information based on the location information. Specifically, the first communication apparatus may report the location information of the first communication apparatus in a process of initially accessing the third communication apparatus, and the third communication apparatus stores the location information of the first communication apparatus. For another example, the first communication apparatus may send request information to the third communication apparatus, to request information about the preferred resource or the non-preferred resource. The first communication apparatus may carry the location information of the first communication apparatus in the request information. For another example, the third communication apparatus may request the location information from the first communication apparatus, and the first communication apparatus reports the location information of the first communication apparatus based on the request from the third communication apparatus. For another example, after accessing the third communication apparatus, the first communication apparatus may also periodically report the location information of the first communication apparatus to the third communication apparatus.

In addition, the third communication apparatus may also listen to signaling, data, or a message sent by the first communication apparatus on a Uu air interface, and determine the location information of the first communication apparatus based on information such as a direction of arrival of the signaling, data, or message of the first communication apparatus on the Uu air interface, an antenna tilt angle, and/or an antenna height.

For example, the third communication apparatus determines the location information of the first communication apparatus based on a beam of signaling sent by the first communication apparatus in an initial access process. For another example, the first communication apparatus may send request information to the third communication apparatus, to request information about the preferred resource or the non-preferred resource. The third communication apparatus may determine the location information of the first communication apparatus based on beam information carrying the request information.

The third communication apparatus may obtain a first correspondence, and determine, based on the first correspondence, the first-type resource and/or the second-type resource corresponding to the location information of the first communication apparatus. The first correspondence may be a correspondence between location information and the first-type resource and/or the second-type resource. Specifically, the first correspondence may include a correspondence between the location information and the first-type resource, a correspondence between the location information and the second-type resource, and/or a correspondence between location information, the first-type resource, and the second-type resource. An example of the first correspondence is shown in Table 1.

TABLE 1

| Location information | First-type resource | | Second-type resource | |
| --- | --- | --- | --- | --- |
| | High-interference resource | High-usage resource | Low-interference resource | Low-usage resource |
| Location 1 | Resource 1 | / | / | / |
| Location 1 | / | Resource 2 | / | / |
| Location 2 | / | / | Resource 3 | / |
| Location 3 | / | / | / | Resource 4 |
| Location 4 | Resource 5 | Resource 6 | Resource 7 | Resource 8 |
| ... | ... | ... | ... | ... |

As shown in Table 1, the first correspondence may reflect a correspondence between one or more pieces of location information and the first-type resource and/or the second-type resource. When a resource related to the first communication apparatus needs to be determined, the third communication apparatus may query, based on the location information of the first communication apparatus, the first correspondence shown in Table 1, to determine the first resource and the second resource that correspond to the location information of the first communication apparatus. For example, if the location information of the first communication apparatus is used to indicate that a location of the first communication apparatus is the location 4, the third communication apparatus may determine that resources related to the first communication apparatus include the resource 5, the resource 6, the resource 7, and the resource 8. The resource 5 and the resource 6 are first-type resources, and the resource 7 and the resource 8 are second-type resources.

It should be understood that the third communication apparatus may further store information about the first-type resource and the second-type resource, to indicate the first-type resource or the second-type resource to the first communication apparatus. For example, the third communication apparatus may store at least one of time domain location information or frequency domain location information, reference signal receiving power (reference signal receiving power, RSRP), channel state information (channel state information, CSI), quality of service (quality of service, QoS), or a feedback report (feedback report) of the first-type resource and the second-type resource.

In a possible example, the information about the first-type resource and the second-type resource in the first correspondence may be obtained by the third communication apparatus from one or more fourth communication apparatuses. The fourth communication apparatus may be a UE of a partial-sensing type or a UE of a full-sensing type within coverage of the third communication apparatus, or a component such as a chip, a processing circuit, or an interface circuit in a UE of a partial-sensing type or a UE of a full-sensing type within coverage of the third communication apparatus. For example, the fourth communication apparatus may include the second communication apparatus or another UE, and may be specifically the VUE 1, the VUE 2, the PUE, the RSU, or the like shown in FIG. 2.

The following specifically describes a manner of obtaining the information about the first-type resource and/or second-type resource by using the VUE 1, the VUE 2, and the third communication apparatus shown in FIG. 2.

The VUE 1 is used as an example. After sensing a resource near the VUE 1, the VUE 1 may learn of interference and usage statuses of the resource near the VUE 1, and the VUE 1 may send first information to the third communication apparatus. The first information may include information about a resource with high interference, high usage, low interference, or low usage or the first information may be used to indicate the first-type resource and/or the second-type resource determined by the VUE 1. In addition, the first information may further include location information of the VUE 1. The location information of the VUE 1 is notified to the third communication apparatus. Alternatively, the third communication apparatus may obtain the location information of the VUE 1 by using beam information sent by the VUE 1. The third communication apparatus may store a correspondence between the location information of the VUE 1 and the first-type resource and/or the second-type resource based on the obtained first information and the location information of the VUE 1. The correspondence may be the first correspondence or a part of the first correspondence.

For example, if a current location of the VUE 1 is the location 1, and a resource currently determined by the VUE 1 through sensing includes the resource 1 with high interference, the VUE 1 may send, to the third communication apparatus, location information corresponding to the location 1 and resource information (for example, at least one of time domain location information or frequency domain location information, RSRP, CSI, QoS, or a feedback report) corresponding to the resource 1, so that the third communication apparatus may store information about the resource 1. In addition, a correspondence between the location 1 and the resource 1 is stored in the first correspondence shown in Table 1.

Specifically, the VUE 1 may report the first information in a process of initially accessing the third communication apparatus. Alternatively, the VUE 1 may send the first information to the third communication apparatus every reporting periodicity (which may be referred to as a first periodicity below, for example, 1 second (s) or 10 s). In addition, the third communication apparatus may send second information to the VUE 1, and trigger, by using the second information, the VUE 1 to send the first information.

In addition, when sensing a change of interference or usage status of a nearby resource, the VUE 1 may further send the first information after the reporting periodicity arrives or the second information is received. Otherwise, if there is no change of interference or usage status of the resource, the VUE 1 may not send the first information even if the reporting periodicity arrives or the second information from the third communication apparatus is received. For example, it is assumed that the VUE 1 sends the first information to the third communication apparatus to indicate that a resource 0 is a high-interference resource. If the VUE 1 detects that the resource 0 becomes a low-interference resource (for example, signal strength of the resource 0 is not greater than or less than the third threshold), the VUE 1 sends new first information to the third communication apparatus. The resource 0 in the new first information is a low-interference resource. If the VUE 1 detects that the signal strength of the resource 0 is less than or not greater than the first threshold, that is, the resource 0 is no longer a high-interference resource, the VUE 1 sends new first information to the third communication apparatus. The resource 0 in the new first information is not used as a high-interference resource. In addition, if the VUE 1 detects that the resource 0 is still a high-interference resource, the VUE 1 does not need to send new first information, to reduce signaling and processing overheads.

In addition, an interference change amplitude threshold and/or a usage change amplitude threshold may be further stored in the VUE 1, or the third communication apparatus indicates the interference change amplitude threshold and/or the usage change amplitude threshold to the VUE 1. After determining that an interference change amplitude of a resource is greater than (or not less than) a signal strength change amplitude threshold, or a usage change amplitude is greater than (or not less than) a usage change amplitude threshold, the VUE 1 triggers sending of the first information. The interference change amplitude or the usage change amplitude may be an absolute value (for example, a change amplitude of signal strength or a change amplitude of usage). The interference change amplitude threshold and the usage change amplitude threshold may be absolute values, or may be a relative value (for example, a percentage of the change amplitude of the signal strength to an interference amplitude in the previous detection or the current detection, for example, 50%).

In addition, when there is another first communication apparatus such as the VUE 2 in the scenario, the third communication apparatus may also obtain, by using the foregoing method, information about the first-type resource and/or the second-type resource determined by the VUE 2. The VUE 2 is a UE of the partial-sensing type or full-sensing type. The VUE 2 may further send location information to the third communication apparatus, to indicate a location of the VUE 2 when the first information is sent (or the first information is determined or the first-type resource and/or the second-type resource are/is determined), or the third communication apparatus may determine, by using beam information sent by the VUE 2, location information of the VUE 2 when the VUE 2 sends the first information. Therefore, the third communication apparatus may collect a plurality of first-type resources and/or second-type resources from a plurality of UEs within the coverage of the third communication apparatus, and store a correspondence between each UE and the first-type resource and/or the second-type resource.

The third communication apparatus may determine a correspondence between location information of each UE and the first-type resource and/or the second-type resource based on the location information of each UE and the correspondence between each UE and the first-type resource and/or the second-type resource, that is, obtain the first correspondence shown in Table 1, or obtain a part of correspondences shown in Table 1.

When determining the first resource information, the third communication apparatus may query Table 1 based on the location information of the first communication apparatus, to obtain the first-type resource corresponding to the location information or the second-type resource corresponding to the location information, or obtain the first-type resource and the second-type resource corresponding to the location information.

It should be understood that the third communication apparatus may store a correspondence between the location information of the first communication apparatus and the first communication apparatus, to obtain the location of the first communication apparatus based on the correspondence. As shown in Table 2, the third communication apparatus may store location information of first communication apparatuses such as UE 1 to UE 5. It should be understood that, in addition to being stored by using the table shown in Table 2, the correspondence may be stored in another form such as a mapping pointer. In addition, it should be further understood that the correspondence between the first communication apparatus and the location information shown in Table 2 is not mandatory for performing the step S101. For example, after receiving the location information of the first communication apparatus from the first communication apparatus, the third communication apparatus may determine the first resource information based on the location information of the first communication apparatus, and does not need to store the correspondence between the first communication apparatus and the location information of the first communication apparatus.

TABLE 2

| First communication apparatus | Location information |
| --- | --- |
| UE 1 | Location 1 |
| UE 2 | Location 1 |
| UE 3 | Location 2 |
| UE 4 | Location 3 |
| UE 5 | Location 4 |
| ... | ... |

Then, the third communication apparatus may query, based on the location information of the first communication apparatus shown in Table 2, the first correspondence shown in Table 1, to obtain the first-type resource and/or the second-type resource corresponding to the first communication apparatus, indicate, to the first communication apparatus, the first-type resource and/or the second-type resource corresponding to the first communication apparatus, and store the correspondence between the first communication apparatus and the first-type resource and/or the second-type resource. For example, as shown in Table 3, the third communication apparatus may store first-type resources and/or second-type resources separately indicated by the third communication apparatus for a plurality of first communication apparatuses such as UE 1 to UE 5.

TABLE 3

| | First-type resource | | Second-type resource | |
| --- | --- | --- | --- | --- |
| First communication apparatus | High-interference resource | High-usage resource | Low-interference resource | Low-usage resource |
| UE 1 | Resource 1 | Resource 2 | / | / |
| UE 2 | Resource 1 | Resource 2 | / | / |
| UE 3 | / | / | Resource 3 | / |
| UE 4 | / | / | / | Resource 4 |
| UE 5 | Resource 5 | Resource 6 | Resource 7 | Resource 8 |
| ... | ... | ... | ... | ... |

As shown in Table 2, location information of the UE 1 is the location 1. In this case, the third communication apparatus may determine, based on Table 1, the resource 1 and/or the resource 2 corresponding to the location 1, and store correspondences between the UE 1 and the resource 1 and between the UE 1 and the resource 2 in Table 3. The UE 1 is used as an example. The first communication apparatus may determine one piece of first resource information, used to indicate that the resource 1 is a first-type resource corresponding to the UE 1, and determine one piece of first resource information, used to indicate that the resource 2 is a first-type resource corresponding to the UE 1. Alternatively, the third communication apparatus may determine one piece of first resource information, used to indicate that the resource 1 and the resource 2 are first-type resources corresponding to the UE 1. In other words, the third communication apparatus may determine and store a plurality of pieces of first resource information. Each piece of resource information is corresponding to one first communication apparatus (such as the UE 1 and the UE 2), and the first resource information sent by the third communication apparatus to one of the first communication apparatuses is at least one of the plurality of pieces of first resource information.

In another example, the third communication apparatus may further determine, based on a resource previously allocated to another communication apparatus and corresponding location information, the correspondence shown in Table 1 or Table 3. For example, if the third communication apparatus allocates the resource 3 shown in Table 1 to the UE 3 whose location information is the location 1, the third communication apparatus may update Table 1 to set the resource 3 in the updated Table 1 as a high-usage resource. Then, if the third communication apparatus further indicates a resource to the UE 3 or another first communication apparatus, it indicates that the resource 3 is the first-type resource.

Based on the foregoing description, the third communication apparatus may determine the first correspondence shown in Table 1 based on information reported by a plurality of UEs such as the VUE 1 and the VUE 2, or with reference to information about the resource previously allocated to another communication apparatus.

Therefore, the third communication apparatus may send the first resource information to the first communication apparatus based on the first correspondence shown in Table 1 and the location information of the first communication apparatus, to assist the first communication apparatus in determining the transmission resource.

The first resource information may be sent to the first communication apparatus in a process in which the first communication apparatus initially accesses the third communication apparatus, or the first resource information may be sent based on third information from the first communication apparatus, or the third communication apparatus may send the first resource information according to a specific periodicity (for example, a second periodicity). The third information is used to request the third communication apparatus to send the first resource information.

Alternatively, the third communication apparatus may send the first resource information after it is determined that the location information of the first communication apparatus changes. The third communication apparatus may determine that the location information of the first communication apparatus changes when it is determined that any one of the following cases occurs: it is determined, based on longitude and latitude information of the first communication apparatus, that a movement distance of the first communication apparatus within specific duration exceeds a specific distance length, for example, 100 meters; or it is determined, based on a zone identifier of the first communication apparatus, that a zone of the first communication apparatus changes; or indication information from the first communication apparatus indicating that the location information changes is received.

Alternatively, the first communication apparatus may notify the third communication apparatus of the type of the first communication apparatus, and the third communication apparatus determines, based on the type of the first communication apparatus, whether and how to send the first resource information to the first communication apparatus. For example, the third communication apparatus sends, by default, the first resource information to the first communication apparatus whose type is the non-sensing type or the partial-sensing type, so as to assist these first communication apparatuses in determining the transmission resource, and the first communication apparatus does not need to send the third information.

In addition, each time after the first resource information is sent, the third communication apparatus may update the first resource information based on information newly reported by the VUE and information about a resource allocated to the first communication apparatus and one or more other communication apparatuses, and send updated first resource information when the first resource information needs to be sent next time. For example, in the updated first resource information, the resource allocated to the first communication apparatus and another communication apparatus may be used as the first-type resource.

Alternatively, the third communication apparatus may update the first correspondence based on the information newly reported by the VUE and/or information about the resource allocated to the first communication apparatus and another communication apparatus, and determine new first resource information based on an updated first correspondence when the first resource information needs to be sent next time. For example, in the updated first correspondence, the resource allocated to the first communication apparatus and another communication apparatus may be used as the first-type resource.

In another implementation of S101, the first communication apparatus may obtain the first resource information from another surrounding UE. For example, as shown in FIG. 2, if the first communication apparatus is the PUE, the another UE may include the VUE 1, the VUE 2, the RSU, or the like. The first resource information sent by each UE may be used to indicate a first-type resource and/or a second-type resource sensed by the UE that sends the first resource information.

Specifically, the first communication apparatus may determine the transmission resource based on the first resource information from the second communication apparatus, and perform sidelink transmission to the second communication apparatus based on the transmission resource. The second communication apparatus is UE of the partial-sensing type or full-sensing type, or a component in UE of the partial-sensing type or full-sensing type.

The following uses an example in which the PUE obtains the second resource information from the VUE 1 for description. The VUE 1 may sense a resource, and determine the first-type resource and/or the second-type resource based on a sensing result. The VUE 1 may periodically send (for example, send according to a third periodicity) the first resource information, to indicate the first-type resource and/or the second-type resource modified by the VUE 1. For a specific periodic sending manner, refer to the description when the VUE 1 periodically sends the first information. Alternatively, the VUE 1 may send the first resource information to the PUE based on fourth information sent by the PUE. The fourth information may be used to request the first resource information. The fourth information may be sent periodically. The fourth information may also be used to request the VUE 1 to send one piece of first resource information or request the VUE 1 to send a plurality of pieces of first resource information according to a periodicity. In addition, the VUE 1 may further send the first resource information after sensing a change of interference or usage status of a nearby resource and after a reporting periodicity arrives or the fourth information is received.

For example, the VUE 1 may carry the location information of the VUE 1 and the first resource information in a same message or signaling for sending. Alternatively, the PUE may obtain the location information of the VUE 1 through sensing.

The PUE may determine, based on the first resource information from the VUE 1, the location information of the VUE 1, and location information of the PUE, whether to use the first resource information. For example, if the location information of the VUE 1 is inconsistent with the location information of the PUE, for example, a distance between a location of the VUE 1 and a location of the PUE that are determined based on the location information exceeds a distance threshold (for example, 50 meters), the PUE may discard the first information. Alternatively, if the location information of the VUE 1 is consistent with the location information of the PUE, for example, a distance between a location of the VUE 1 and a location of the PUE that are determined based on the location information does not exceed a distance threshold, the PUE may retain the first resource information, because the transmission resource is subsequently determined based on the first resource information.

If the PUE receives the first resource information sent by a plurality of UEs, the PUE may further obtain location information of the UE shown in Table 4 and a correspondence between the first-type resource and/or the second-type resource corresponding to the UE. A location 5 to a location 9 shown in Table 4 are location information of a plurality of UEs, and the plurality of UEs include but are not limited to the VUE 1, the VUE 2, and the RSU shown in FIG. 2. For a manner of determining the correspondence shown in Table 3, refer to a manner of determining the correspondence shown in Table 1 by the third communication apparatus. It should be understood that each row in Table 4 may indicate a correspondence between the location information of the UE and the first resource information sent by the UE. Therefore, the location information of the UE and the first-type resource and/or the second-type resource indicated by the UE may be determined according to Table 4. For example, the first row in Table 4 may indicate that the first resource information sent by the UE at the location 5 is used to indicate that the resource 9 is a first-type resource.

TABLE 4

|  | First-type resource | | Second-type resource | |
| --- | --- | --- | --- | --- |
| Location information of a UE | High-interference resource | High-usage resource | Low-interference resource | Low-usage resource |
| Location 5 | Resource 9 | / | / | / |
| Location 6 | / | Resource 10 | / | / |
| Location 7 | / | / | Resource 11 | / |
| Location 8 | / | / | / | Resource 12 |
| Location 9 | Resource 13 | Resource 14 | Resource 15 | Resource 16 |
| . . . | . . . | . . . | . . . | . . . |

When the PUE needs to perform sidelink transmission, the PUE may determine, based on Table 4 and the location information of the PUE, information about a first-type resource and/or a second-type resource corresponding to the location information of the PUE, and further determine the transmission resource based on the first-type resource and/or the second-type resource. For example, if a current location of the PUE is the location 7, the PUE may determine that the corresponding second-type resource is the resource 11, and may subsequently determine the transmission resource based on the second-type resource.

In addition, during implementation of S101, the first resource information may include the first correspondence shown in Table 1. The first correspondence may be broadcast by the third communication apparatus, and the first correspondence may be determined by the third communication apparatus based on the first-type resource and/or the second-type resource reported by at least one UE. After receiving the first correspondence broadcast by the third communication apparatus, the first communication apparatus may determine, based on the location information of the first communication apparatus and the first correspondence, the first-type resource and/or the second-type resource corresponding to the location information of the first communication apparatus, and may subsequently determine the transmission resource based on the first-type resource and/or the second-type resource.

For example, after the first communication apparatus determines the resource related to the first communication apparatus, the first communication apparatus may store a correspondence between the first communication apparatus and the first-type resource or the second-type resource.

TABLE 5

|  | First-type resource | | Second-type resource | |
| --- | --- | --- | --- | --- |
| First communication apparatus | High-interference resource | High-usage resource | Low-interference resource | Low-usage resource |
| UE 1 | Resource 1 | / | / | / |

As shown in Table 5, after determining that the resource 1 is the high-interference resource related to the UE 1, the UE 1 may store the correspondence shown in Table 5, to subsequently determine the transmission resource based on the first-type resource or the second-type resource in the correspondence.

In an implementation of S102, in a possible example, if the first communication apparatus determines that the type of the first communication apparatus is the no-sensing type, the first communication apparatus may select the transmission resource based on a resource other than the first-type resource or based on the second-type resource. For example, the second-type resource or a resource other than the first-type resource is used as the transmission resource. Because the resource does not include the first-type resource, that is, does not include the non-preferred resource, interference to sidelink transmission performed by the first communication apparatus on the transmission resource is relatively small. Therefore, in this implementation, the first communication apparatus does not need to sense the resource, or the first communication apparatus is not required to have a sensing capability, the first communication apparatus obtains the preferred resource from the third communication apparatus (for example, the network device), to avoid a resource congestion problem. In this manner, even if the type of the first communication apparatus is the no-sensing type, interference to the first communication apparatus during sidelink transmission can be reduced.

Specifically, the resource other than the first resource may be the resource other than the first-type resource in the resource pool. For example, if the resource pool configured for the UE 1 includes a resource 1, a resource 17, and a resource 18, and as shown in Table 5, the resource 1 is a first-type resource, the UE 1 may select the transmission resource from the resource 17 and the resource 18. A manner of selecting the transmission resource may include random selection or polling selection. If the random selection manner is used, each time the UE 1 sends sidelink transmission data, the UE 1 randomly selects the transmission resource from the resource 17 or the resource 18. If the polling selection manner is used, the UE 1 uses the resource 17 (or the resource 18) as the transmission resource when sending sidelink transmission data for the first time, uses the resource 18 (or the resource 17) as the transmission resource when sending sidelink transmission data next time, uses the resource 17 (or the resource 18) as the transmission resource when sending sidelink transmission data next time, and so on.

In addition, the first communication apparatus may select the transmission resource from the second-type resource indicated by the first resource information. For example, as shown in Table 4, if the current location of the first communication apparatus is the location 7, and the first resource information corresponding to the location 7 indicates that the resource 11 is the second-type resource, the first communication apparatus may determine the resource 11 indicated by the first resource information as the transmission resource. In addition, if there are a plurality of second-type resources, the transmission resource may be selected in the random selection manner or the polling selection manner.

In another possible example, if the first communication apparatus determines that the sensing type of the first communication apparatus is the partial-sensing type, the first communication apparatus may determine, from resources in the resource pool of the first communication apparatus, the second resource or the resource other than the first resource as the transmission resource. In this manner, a partial-sensing UE can obtain the preferred resource from the network device. Therefore, a resource congestion problem of the partial-sensing UE in a time range outside a sensing window can be avoided In addition, the third communication apparatus (for example, the network device) indicates resource information, so that the partial-sensing UE can better select the transmission resource, to further reduce interference to sidelink transmission of the first communication apparatus.

In addition, to reduce power consumption, when the first communication apparatus determines that the type of the first communication apparatus is the full-sensing type, in this solution, the third communication apparatus (for example, the network device) may indicate the resource information, so that the first communication apparatus can better select the transmission resource, or the first communication apparatus can properly reduce resource sensing, and determine the transmission resource based on the resource information indicated by the third communication apparatus, to avoid the resource congestion problem and reduce power consumption.

For example, as shown in Table 3, if the UE 5 determines that the sensing type of the UE 5 is the partial-sensing type or the full-sensing type, and the first resource information indicates that the resource 5 and the resource 6 are first-type resources corresponding to the UE 2, and the resource 7 and the resource 8 are second-type resources corresponding to the UE 5, the UE 5 may select the transmission resource from the resource 7 and the resource 8 in a random selection or polling selection manner, to send sidelink transmission data by using the transmission resource.

In another possible example, if the first communication apparatus determines that the type of the first communication apparatus is the partial-sensing type or the full-sensing type, and the first resource information is used to indicate the first-type resource, in an implementation of S102, the first communication apparatus may sense signal strength or usage of a resource other than the first-type resource, and determine, based on a sensing result and the first resource information, the transmission resource from the resource other than the first-type resource. In this manner, the first communication apparatus can select the resource other than the first-type resource as the transmission resource based on the first resource information and the sensing result obtained by the first communication apparatus, to further reduce interference received when the selected transmission resource is used to send the sidelink transmission data. In addition, the first communication apparatus no longer needs to sense the first-type resource, so that power consumption can be reduced.

For example, as shown in Table 3, if the UE 2 determines that the sensing type of the UE 2 is the partial-sensing type or the full-sensing type, and the first resource information indicates that the resource 1 and the resource 2 are first-type resources corresponding to the UE 2, the UE 2 may sense a resource other than the resource 1 and the resource 2, to obtain a sensing result of signal strength or usage, and may further select the transmission resource from the resource other than the resource 1 and the resource 2 based on the signal strength or usage, for example, select a resource with minimum signal strength or lowest usage as the transmission resource.

In another possible example, if the first communication apparatus determines that the type of the first communication apparatus is the partial-sensing type or the full-sensing type, and the first resource information is used to indicate the first-type resource, in an implementation of S102, the first communication apparatus may determine the resources in the resource pool of the first communication apparatus, and sense all resources in the resource pool, to obtain signal strength of these resources and priorities of data transmitted by using these resources. The resources in the resource pool include the first-type resource. A priority of data transmitted by using a resource is a priority that is of data transmitted by using a resource and that is sensed by the first communication apparatus, for example, a priority of a service to which the data belongs. The priority may be obtained based on data that is transmitted on the resource and that is received by the first communication apparatus in a sensing process.

Further, the first communication apparatus may determine a first signal strength threshold (unit: decibel (dB)) for the first-type resource based on a priority of data transmitted by using the first-type resource and a priority of sidelink transmission data sent by the first communication apparatus, and determine a second signal strength threshold for the first-type resource based on the first signal strength threshold. The second signal strength threshold for the first-type resource is less than the first signal strength threshold for the first-type resource. Then, the first communication apparatus determines, based on the second signal strength threshold for the first-type resource and the sensed signal strength of the first-type resource, whether to use the second-type resource as a candidate resource. After it is determined whether each resource in the resource pool is used as the candidate resource, the transmission resource may be selected from the candidate resource, and the sidelink transmission data is sent by using the transmission resource.

As shown in Table 6, the first communication apparatus may store a correspondence among a signal strength threshold, a priority of sidelink transmission data to be sent by the first communication apparatus, and a priority of data transmitted by using a resource sensed by the first communication apparatus. In Table 6, pi represents the priority of sidelink transmission data to be sent by the first communication apparatus, pj represents the priority of data transmitted by using a resource sensed by the first communication apparatus, a number 1 represents a priority 1, 2 represents a priority 2, and so on. A higher priority of data indicates a higher priority of transmission of the data. SL-ThresRSRP_pi_pj indicates a signal strength threshold corresponding to pi and pj.

TABLE 6

| SL-ThresRSRP_pi_pj (/dB) | pi | pj |
|---|---|---|
| 15 | 1 | 1 |
| 10 | 1 | 2 |
| 20 | 2 | 1 |
| ... | ... | ... |

After determining that there is sidelink transmission data to be transmitted, the first communication apparatus may determine the first signal strength threshold for the first-type resource based on the correspondence shown in Table 6, a priority (that is, pi) of the sidelink transmission data, and a priority (that is, pj) of data transmitted on a sensed first-type resource. For example, if pi=1 and pj=1, the first signal strength threshold for the first-type resource is 15 dB. In this case, according to the foregoing method, the first communication apparatus may determine that the second signal strength threshold for the first-type resource is 10 (or another value less than 15) dB. It should be understood that the correspondence shown in Table 6 may be prestored in the first communication apparatus, or may be sent by the third communication apparatus to the first communication apparatus.

Then, if the first communication apparatus determines that the signal strength of the first-type resource is less than (or not greater than) the second signal strength threshold for the first-type resource, the first communication apparatus may use the first-type resource as the candidate resource. The first communication apparatus may further use another resource as the candidate resource based on a signal strength threshold and signal strength of the another sensed resource when the signal strength of the resource is less than (or not greater than) the signal strength threshold for the resource. The first communication apparatus may further determine the transmission resource from all candidate resources, for example, select a candidate resource with minimum signal strength as the transmission resource based on signal strength of all sensed candidate resources.

In this manner, the first communication apparatus can select the transmission resource based on the sensing result of each resource in the resource pool and the non-preferred resource indicated by the first resource information. A condition for selecting the non-preferred resource indicated by the first resource information as the transmission resource is stricter than a condition when the resource is not indicated as the non-preferred resource. In other words, the condition for selecting the non-preferred resource as the transmission resource is limited. Therefore, the non-preferred resource is less likely to be determined as the transmission resource, to reduce interference received by the first communication apparatus in a sidelink transmission process. In addition, in this manner, the finally selected transmission resource may still be the first-type resource indicated by the first resource information. Therefore, a possibility of sidelink data transmission by using the first-type resource is not excluded, to improve a transmission success rate. In addition, the first communication apparatus no longer senses the first-type resource, so that power consumption can be reduced.

In another possible example, if the first communication apparatus determines that the type of the first communication apparatus is the partial-sensing type or the full-sensing type, and the first resource information is used to indicate the second-type resource, in an implementation of S102, the first communication apparatus may sense signal strength or usage of the second-type resource, and determine, based on a sensing result and the first resource information, the transmission resource from the second-type resource. In this manner, the first communication apparatus can select the transmission resource from the second-type resource based on the first resource information and the sensing result obtained by the first communication apparatus, to further reduce interference received when the selected transmission resource is used to send the sidelink transmission data.

For example, as shown in Table 3, if the UE 5 determines that the sensing type of the UE 5 is the partial-sensing type or the full-sensing type, and the first resource information indicates that the resource 7 and the resource 8 are second-type resources corresponding to the UE 5, the UE 5 may sense the resource 7 and the resource 8, to obtain a sensing result of signal strength or usage, and may further select the transmission resource from the resource 7 and the resource 8 based on the signal strength or usage, for example, select a resource with minimum signal strength or lowest usage as the transmission resource.

In another possible example, if the first communication apparatus determines that the type of the first communication apparatus is the partial-sensing type or the full-sensing type, and the first resource information is used to indicate the second-type resource, in an implementation of S102, the first communication apparatus may determine the resources in the resource pool of the first communication apparatus, and sense all resources in the resource pool, to obtain signal strength of these resources and priorities of data transmitted by using these resources. The resources in the resource pool include the second-type resource.

Further, the first communication apparatus may determine a first signal strength threshold for the second-type resource based on a priority of data transmitted by using the second-type resource and a priority of sidelink transmission data to be sent by the first communication apparatus, and determine a second signal strength threshold for the second-type resource based on the first signal strength threshold. The second signal strength threshold for the second-type resource is less than the first signal strength threshold for the second-type resource. Then, the first communication apparatus determines, based on the second signal strength threshold for the second-type resource and the sensed signal strength of the second-type resource, whether to use the second-type resource as a candidate resource. After it is determined whether each resource in the resource pool is used as the candidate resource, the transmission resource may be selected from the candidate resource, and the sidelink transmission data is sent by using the transmission resource.

For a method for determining the second signal strength threshold for the second-type resource by the first communication apparatus, refer to the foregoing description of determining the second signal strength threshold for the first-type resource by the first communication apparatus.

After determining a second signal strength threshold for a second-type resource, the first communication apparatus may determine, based on a value of signal strength of the sensed second-type resource and a value of the second signal strength threshold for the second-type resource, whether to use the second-type resource as the candidate resource. Specifically, for example, if the first communication apparatus determines that the signal strength of the second-type resource is less than (or not greater than) the second signal strength threshold of the second-type resource, the first communication apparatus may use the second-type resource as the candidate resource. The first communication apparatus may further use another resource as the candidate resource based on a signal strength threshold and signal strength of the another sensed resource when the signal strength of the resource is less than (or not greater than) the signal strength threshold for the resource. The first communication apparatus may further determine the transmission resource from all candidate resources, for example, select a candidate resource with minimum signal strength as the transmission resource based on signal strength of all sensed candidate resources.

In this manner, the first communication apparatus can select the transmission resource based on the sensing result of each resource in the resource pool and the preferred resource indicated by the first resource information. A condition for selecting the preferred resource indicated by the first resource information as the transmission resource is relaxed. In other words, the preferred resource indicated by the first resource information is more likely to be selected as the resource, to reduce interference received by the first communication apparatus in a sidelink transmission process.

In another possible example, if the first communication apparatus determines that the type of the first communication apparatus is the partial-sensing type or the full-sensing type, and the first resource information is used to indicate the first-type resource and the second-type resource, in an implementation of S102, the first communication apparatus may determine the resources in the resource pool of the first communication apparatus, and sense all resources in the resource pool, to obtain signal strength of these resources and priorities of data transmitted by using these resources. The resources in the resource pool include the first-type resource and the second-type resource.

Further, the first communication apparatus may determine a first signal strength threshold for the first-type resource based on a priority of data transmitted by using the first-type resource and a priority of sidelink transmission data sent by the first communication apparatus, and determine a second signal strength threshold for the first-type resource based on the first signal strength threshold. The second signal strength threshold for the first-type resource is less than the first signal strength threshold for the first-type resource. The first communication apparatus may determine a first signal strength threshold for the second-type resource based on a priority of data transmitted by using the second-type resource and the priority of sidelink transmission data sent by the first communication apparatus, and determine a second signal strength threshold for the second-type resource based on the first signal strength threshold. The second signal strength threshold for the second-type resource is less than the first signal strength threshold for the second-type resource. For manners of determining the second signal strength threshold for the first-type resource and determining the second signal strength threshold for the second-type resource, refer to the foregoing descriptions. Details are not described herein again.

Then, the first communication apparatus may determine, based on the second signal strength threshold for the first-type resource and the sensed signal strength of the first-type resource, whether to use the first-type resource as a candidate resource. In addition, the first communication apparatus may determine, based on the second signal strength threshold for the second-type resource and the sensed signal strength of the second-type resource, whether to use the second-type resource as the candidate resource. After it is determined whether each resource in the resource pool is used as the candidate resource, the transmission resource may be selected from the candidate resource, and the sidelink transmission data is sent by using the transmission resource.

In this manner, the transmission resource can be selected based on the sensing result of each resource in the resource pool and the preferred resource and the non-preferred resource that are indicated by the first resource information. A condition for selecting the preferred resource indicated by the first resource information as the transmission resource is relaxed, and a condition for selecting the non-preferred resource as the transmission resource is limited, to reduce interference received by the first communication apparatus in a sidelink transmission process. In addition, in this manner, the finally selected transmission resource may still be the first-type resource indicated by the first resource information.

In another possible example, if the first communication apparatus determines that the type of the first communication apparatus is the partial-sensing type or the full-sensing type, and the first resource information is used to indicate the first-type resource and the second-type resource, in an implementation of S102, the first communication apparatus may determine the resources in the resource pool of the first communication apparatus, further determine the resource other than the first-type resource in the resource pool, and sense the resource other than the first-type resource in the resource pool, to obtain signal strength of these resources and priorities of data transmitted by using these resources. The resource other than the first-type resource in the resource pool includes the second-type resource.

Further, the first communication apparatus may determine a first signal strength threshold for the second-type resource based on a priority of data transmitted by using the second-type resource and a priority of sidelink transmission data sent by the first communication apparatus, and determine a second signal strength threshold for the second-type resource based on the first signal strength threshold. The second signal strength threshold for the second-type resource is less than the first signal strength threshold for the second-type resource. For a manner of determining the second signal strength threshold for the second-type resource, refer to the foregoing description. Details are not described herein again.

Then, the first communication apparatus may determine, based on the second signal strength threshold for the second-type resource and the sensed signal strength of the second-type resource, whether to use the second-type resource as a candidate resource. After it is determined whether each resource other than the first-type resource in the resource pool is used as the candidate resource, the transmission resource may be selected from the candidate resource, and the sidelink transmission data is sent by using the transmission resource.

In this manner, the transmission resource can be selected from the resource other than the first resource in the resource pool based on the first resource information and the sensing result of each resource other than the first resource in the resource pool and the preferred resource indicated by the first resource information. A condition for selecting the preferred resource indicated by the first resource information as the transmission resource is relaxed, and the non-preferred resource is not selected as the transmission resource, to reduce interference received by the first communication apparatus in a sidelink transmission process. In addition, in this manner, the first communication apparatus no longer needs to sense the first-type resource, so as to reduce power consumption.

Figure 5:
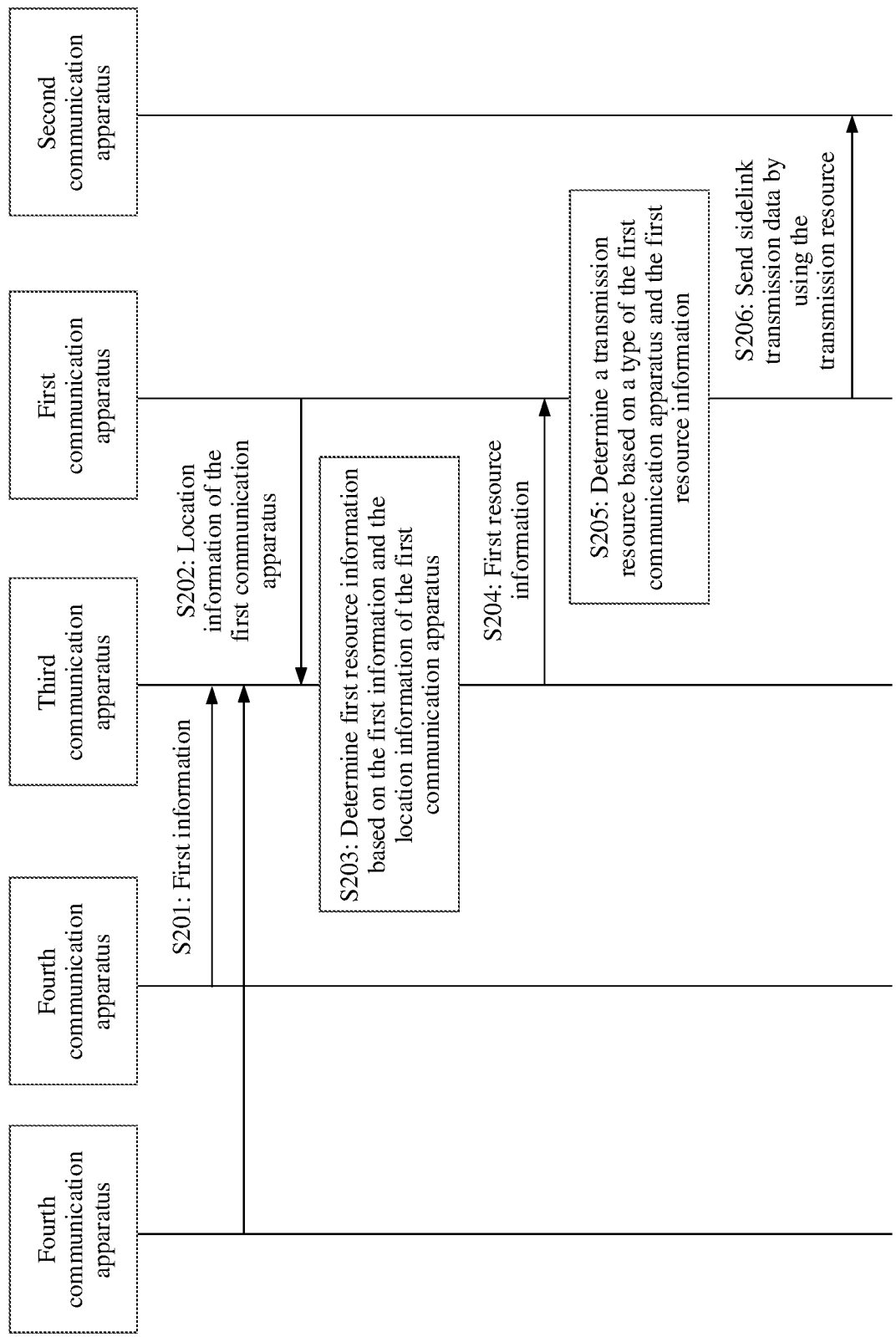
FIG. 5 is a schematic flowchart of another communication method according to an embodiment of this application.

The following describes, by using FIG. 5, an implementation process of a communication method according to an embodiment of this application. It should be understood that the method may be implemented by a first communication apparatus, a second communication apparatus, a third communication apparatus, and a fourth communication apparatus. The third communication apparatus is a base station, the first communication apparatus accesses the third communication apparatus, and the fourth communication apparatus is located within a signal range of the third communication apparatus. The method may be used by the first communication apparatus to obtain a transmission resource, so as to perform sidelink transmission with the second communication apparatus by using the transmission resource.

As shown in FIG. 5, the communication method provided in this embodiment of this application may include the following steps.

S201: At least one fourth communication apparatus sends first information to the third communication apparatus.

Each fourth communication apparatus is a UE of a partial-sensing type or full-sensing type within coverage of the third communication apparatus.

Each piece of first information may include a resource sensing result (for example, an index of a sensed resource and signal strength or usage of the resource) of the fourth communication apparatus sending the first information, or include information about a first-type resource and/or information about a second-type resource that are/is sensed by the fourth communication apparatus sending the first information. The first information may further include location information of the fourth communication apparatus sending the first information.

It should be understood that the first information may be sent by the fourth communication apparatus to the third communication apparatus according to a specified periodicity, or the fourth communication apparatus may send the first information when sensing a change of interference or usage status of a nearby resource. Specifically, for a manner of reporting the first information based on a resource change status, refer to the foregoing description of the manner of sending the first information. In addition, the first information may be further sent by the fourth communication apparatus after the fourth communication apparatus receives second information from the third communication apparatus. The second information may be used to request the fourth communication apparatus to send the first information. The second information may be sent by the third communication apparatus according to a specified periodicity, or may be sent by the third communication apparatus after the third communication apparatus receives a request from the first communication apparatus, or may be sent after the first communication apparatus accesses the third communication apparatus (or requests to access the third communication apparatus).

Correspondingly, the third communication apparatus receives the first information.

S202: The third communication apparatus receives location information of the first communication apparatus.

The first communication apparatus is a UE of a no-sensing type, partial-sensing type, or full-sensing type.

For example, the first communication apparatus may report the location information of the first communication apparatus in a process of initially accessing the third communication apparatus, and the third communication apparatus stores the location information of the first communication apparatus. In addition, the first communication apparatus may further periodically report the location information of the first communication apparatus, to obtain updated first resource information.

In addition, the first communication apparatus may further send third information to the third communication apparatus, to request to obtain first resource information, and carry the location information in the third information. Alternatively, the first communication apparatus may notify the third communication apparatus of the location information and a type of the first communication apparatus, so that the third communication apparatus determines whether to send the first resource information to the first communication apparatus. For the first communication apparatus of the no-sensing type or partial-sensing type, the third communication apparatus may send the first resource information to the first communication apparatus by default, to assist the first communication apparatus in determining a transmission resource. The third information may be sent when the first communication apparatus initially accesses the third communication apparatus, or may be periodically sent by the first communication apparatus.

S203: The third communication apparatus determines the first resource information based on the first information from the at least one fourth communication apparatus and the location information of the first communication apparatus. The first resource information is used to indicate a first-type resource and/or a second-type resource corresponding to the location information of the first communication apparatus.

After receiving the first information from the at least one fourth communication apparatus, the third communication apparatus may update a correspondence between the location information of the fourth communication apparatus and the first-type resource and/or the second-type resource to a first correspondence. The first correspondence may include correspondences between location information of a plurality of fourth communication apparatuses and the first-type resource and/or the second-type resource. In addition, if the first information includes the sensing result of the resource sensed by the fourth communication apparatus, the third communication apparatus may determine the first-type resource and/or the second-type resource based on the sensing result, to obtain the correspondence between the location information of the fourth communication apparatus and the first-type resource and/or the second-type resource. The first correspondence may be shown in Table 1.

After receiving the location information of the first communication apparatus, the third communication apparatus may determine, based on the first correspondence, the first-type resource and/or the second-type resource corresponding to the location information of the first communication apparatus, and use the determined first resource information to indicate the first-type resource and/or the second-type resource.

S204: The third communication apparatus sends the first resource information to the first communication apparatus.

Specifically, the first resource information may be carried in messages or signaling such as a link establishment message, a resource allocation message, downlink control signaling and a message thereof, and an initial access radio resource control (radio resource control) configuration message. It should be understood that the first resource information may be sent separately, or may be sent together with other information.

Correspondingly, the first communication apparatus receives the first resource information.

S205: The first communication apparatus determines the transmission resource based on the type of the first communication apparatus and the first resource information.

A manner in which the first communication apparatus determines the transmission resource based on the type of the first communication apparatus and the first resource information may include any implementation of the step S102.

S206: The first communication apparatus sends sidelink transmission data to the second communication apparatus based on the transmission resource.

Based on the foregoing method, the first communication apparatus may select a resource based on the first resource information from the third communication apparatus, and perform sidelink transmission based on the selected resource. Because the first resource information may be determined based on a preferred resource and/or a non-preferred resource and the location information of the first communication apparatus, the first communication apparatus may determine, based on the preferred resource and/or the non-preferred resource, the transmission resource used to transmit the sidelink transmission data, to reduce transmission interference during sidelink transmission.

In correspondence to the methods provided in the foregoing method embodiments, an embodiment of this application further provides a corresponding apparatus. The apparatus includes corresponding modules configured to perform the foregoing embodiments. The module may be software, hardware, or a combination of software and hardware.

Figure 6:
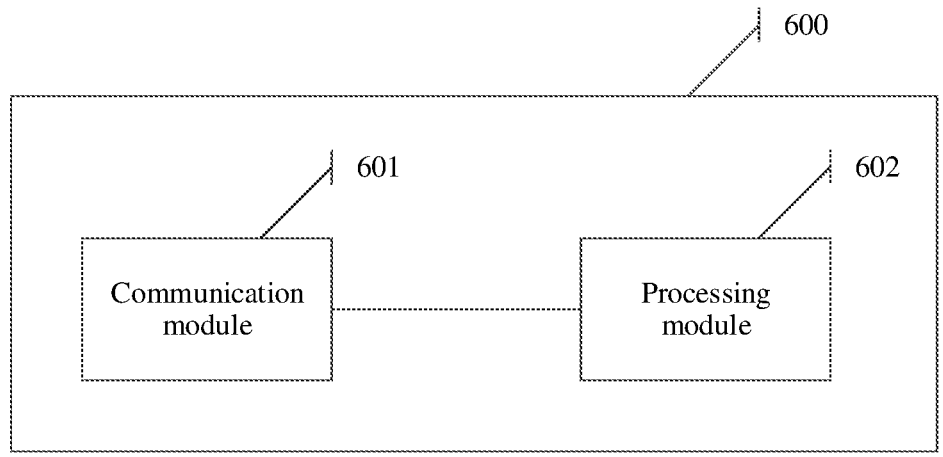
FIG. 6 is a schematic diagram of a structure of a communication apparatus according to an embodiment of this application.

FIG. 6 is a schematic diagram of a structure of an apparatus. The apparatus 600 may be a terminal device, or may be a chip, a chip system, a processor, or the like that supports the terminal device in implementing the foregoing methods. The apparatus 600 may be configured to implement the methods described in the foregoing method embodiments. For details, refer to the descriptions in the foregoing method embodiments.

As shown in FIG. 6, a communication apparatus provided in an embodiment of this application may include a communication module 601 and a processing module 602. The communication module 601 and the processing module 602 are coupled to each other. The communication apparatus 600 may be configured to perform the steps performed by the first communication apparatus or the third communication apparatus shown in FIG. 4 or FIG. 5. The communication module 601 may be configured to support the communication apparatus 600 in communication. The communication module 601 may also be referred to as a communication unit, a communication interface, a transceiver module, or a transceiver unit. The communication module 601 may have a wireless communication function, for example, can communicate with another communication apparatus in a wireless communication manner. The processing module 602 may also be referred to as a processing unit, and may be configured to support the communication apparatus 600 in performing processing actions of the first communication apparatus or the third communication apparatus in the foregoing method embodiments, including but not limited to: generating information or a message sent by the communication module 601, demodulating and decoding a signal received by the communication module 601, and/or the like.

In a possible design, when performing the steps performed by the first communication apparatus in FIG. 4 or FIG. 5 in the foregoing method embodiments, the processing module 602 may be configured to obtain first resource information. For a manner of setting the first resource information, refer to the description of the first resource information in the foregoing method embodiments. The processing module 602 may further determine a transmission resource based on a type of the first communication apparatus and the first resource information. The communication module 601 may be configured to transmit sidelink transmission data by using the transmission resource, for example, send sidelink transmission data to a second communication apparatus by using the transmission resource.

Specifically, that the processing module 602 obtains the first resource information may mean that the processing module 602 receives the first resource information from the communication module 601. The first resource information may come from a third communication apparatus. The third communication apparatus is a user equipment such as a network device, a leader UE, or a roadside processing unit. In addition, the first resource information may come from the second communication apparatus, and the second communication apparatus may include a UE of a partial-sensing type or full-sensing type. In this case, the communication module 601 may be further configured to send sidelink transmission data to the second communication apparatus by using the transmission resource.

In a possible design, the processing module 602 may be configured to: determine that the type of the first communication apparatus is a no-sensing type, and select the transmission resource based on a second-type resource or a resource other than a first-type resource.

In a possible design, the processing module 602 may be configured to: determine that the type of the first communication apparatus is the partial-sensing type or the full-sensing type, determine a resource pool, and select the transmission resource from a second-type resource or a resource other than a first-type resource in the resource pool.

In a possible design, if the first resource information indicates the second-type resource, the processing module 602 may be configured to: determine that the type of the first communication apparatus is the partial-sensing type or full-sensing type, sense the second-type resource to obtain signal strength or usage of the second-type resource, and determine the transmission resource from the second-type resource based on a sensing result. That the processing module 602 senses a resource may include that the processing module 602 receives, by using the communication module 601, data sent by another UE on the resource, and the processing module 602 parses the received data to obtain information such as signal strength of the data transmitted on the resource, usage of the resource, or a priority of the data sent on the resource.

In a possible design, if the first resource information indicates the first-type resource, the processing module 602 may determine that the type of the first communication apparatus is the partial-sensing type or full-sensing type, sense a resource other than the first resource to obtain signal strength or usage of the resource, and determine the transmission resource from the resource other than the first resource based on a sensing result.

In a possible design, if the first resource information indicates the first-type resource, the processing module 602 may determine that the type of the first communication apparatus is the partial-sensing type or full-sensing type, sense a resource other than the first resource to obtain signal strength or usage of the resource, and determine the transmission resource from the resource other than the first resource based on a sensing result.

In a possible design, if the first resource information indicates the first-type resource, the processing module 602 may determine that the type of the first communication apparatus is the partial-sensing type or full-sensing type, and obtain a resource in the resource pool of the first communication apparatus. The resources in the resource pool of the first communication apparatus include the first-type resource. The processing module 602 may further sense signal strength of the resources in the resource pool of the first communication apparatus and priorities of data transmitted by using the resources. Then, the processing module 602 may determine a first signal strength threshold for the first-type resource based on a priority of the sidelink transmission data and a priority of data transmitted by using the first-type resource. The processing module 602 may further determine a second signal strength threshold for the first-type resource based on the first resource information. The second signal strength threshold is less than the first signal strength threshold for the first-type resource. The processing module 602 may further determine, based on the second signal strength threshold and the signal strength of the first-type resource, whether to use the first-type resource as a candidate resource. The candidate resource is used to determine the transmission resource. The processing module 602 may further determine the transmission resource from the candidate resource.

In a possible design, if the first resource information indicates the second-type resource, the processing module 602 may determine that the type of the first communication apparatus is the partial-sensing type or full-sensing type, and obtain a resource in the resource pool of the first communication apparatus. The resources in the resource pool of the first communication apparatus include the first-type resource. The processing module 602 may further sense signal strength of the resources in the resource pool of the first communication apparatus and priorities of data transmitted by using the resources, and determine a first signal strength threshold for the second-type resource based on a priority of the sidelink transmission data and a priority of data transmitted by using the sensed second-type resource. The processing module 602 may further determine a second signal strength threshold for the second-type resource based on the first resource information. The second signal strength threshold is less than the first signal strength threshold for the second-type resource. Further, the processing module 602 may further determine, based on the second signal strength threshold and the signal strength of the second-type resource, whether to use the second-type resource as a candidate resource. The candidate resource is used to determine the transmission resource. Subsequently, the processing module 602 may further determine the transmission resource from the candidate resource.

In a possible design, if the first resource information indicates the first-type resource and the second-type resource, the processing module 602 may determine that the type of the first communication apparatus is the partial-sensing type or full-sensing type, and obtain a resource in the resource pool of the first communication apparatus. The resources in the resource pool of the first communication apparatus include the first-type resource and the second-type resource. The processing module 602 may further sense signal strength of the resources in the resource pool of the first communication apparatus and priorities of data transmitted by using the resources, determine a first signal strength threshold for the first-type resource based on a priority of the sidelink transmission data and a priority of data transmitted by using the first-type resource, and determine a first signal strength threshold for the second-type resource based on the priority of the sidelink transmission data and a priority of data transmitted by using the second-type resource. Then, the processing module 602 may further determine a second signal strength threshold for the first-type resource and a second signal strength threshold for the second-type resource based on the first resource information. The second signal strength threshold for the first-type resource is less than the first signal strength threshold for the first-type resource, and the second signal strength threshold for the second-type resource is less than the second signal strength threshold for the second-type resource. Further, the processing module 602 may further determine, based on the second signal strength threshold for the first-type resource and the signal strength of the first-type resource, whether to use the first-type resource as a candidate resource; and determine, based on the second signal strength threshold for the second-type resource and the signal strength of the second-type resource, whether to use the second-type resource as the candidate resource. The candidate resource is used to determine the transmission resource. Then, the processing module 602 may further determine the transmission resource from all candidate resources.

In a possible design, if the first resource information indicates the first-type resource and the second-type resource, the processing module 602 may determine that the type of the first communication apparatus is the partial-sensing type or full-sensing type, and obtain a resource in the resource pool of the first communication apparatus. The resource other than the first-type resource includes the first-type resource and the second-type resource. The processing module 602 may further sense signal strength of the resource other than the first-type resource and a priority of data transmitted by using the resource, and determine a first signal strength threshold for the second-type resource based on a priority of the sidelink transmission data and a priority of data transmitted by using the second-type resource. Then, the processing module 602 may further determine a second signal strength threshold for the second-type resource based on the first resource information. The second signal strength threshold is less than the first signal strength threshold for the second-type resource. The processing module 602 may further determine, based on the second signal strength threshold and the signal strength of the second-type resource, whether to use the second-type resource as a candidate resource. The candidate resource is used to determine the transmission resource. Then, the processing module 602 may further determine the transmission resource from the candidate resource.

When performing the steps performed by the third communication apparatus in FIG. 4 or FIG. 5 in the foregoing method embodiments, the processing module 602 may be configured to determine the first-type resource and/or the second-type resource based on the location information of the first communication apparatus. The communication module 601 may be configured to send the first resource information to the first communication apparatus. The first resource information is used to indicate a resource related to the first communication apparatus. For descriptions of the resource related to the first communication apparatus and/or the first resource information, refer to the descriptions in the foregoing method embodiments.

In a possible example, the processing module 602 may obtain a first correspondence, and determine, based on the first correspondence and the location information of the first communication apparatus, the first-type resource and/or the second-type resource corresponding to the location information of the first communication apparatus. For description of the first correspondence, refer to the descriptions in the foregoing method embodiments.

In a possible example, the communication module 601 may receive first information from a fourth communication apparatus. The first information is used to indicate the first-type resource and/or the second-type resource determined by the fourth communication apparatus. The processing module 602 may further obtain location information of the fourth communication apparatus. For example, the processing module 602 receives the location information of the fourth communication apparatus from the communication module 601, and the location information sent by the fourth communication apparatus is received by the communication module 601. Alternatively, the processing module 602 obtains, by using the communication module 601, information such as a direction of arrival of information sent by the fourth communication apparatus, and determines the location information of the fourth communication apparatus based on the information. The processing module 602 may determine the first correspondence based on the location information of the fourth communication apparatus and the first-type resource and/or the second-type resource determined by the fourth communication apparatus.

In a possible example, the communication module 601 may receive the first information in a process in which the fourth communication apparatus initially accesses the third communication apparatus. Alternatively, the communication module 601 may receive the first information according to a first periodicity. The communication module 601 may further send second information to the fourth communication apparatus. The second information is used to request resource information sensed by the fourth communication apparatus. In other words, the second information is used to request the first information.

In a possible example, the communication module 601 may send the first resource information in a process in which the fourth communication apparatus initially accesses the third communication apparatus. Alternatively, the communication module 601 may send the first resource information according to a second periodicity. Alternatively, the communication module 601 may send the first resource information when the location information of the first communication apparatus changes.

In a possible example, the communication module 601 may be further configured to receive third information from the first communication apparatus. The third information is used to request information about a resource related to the first communication apparatus. In other words, the third information is used to request the first resource information.

Figure 7:
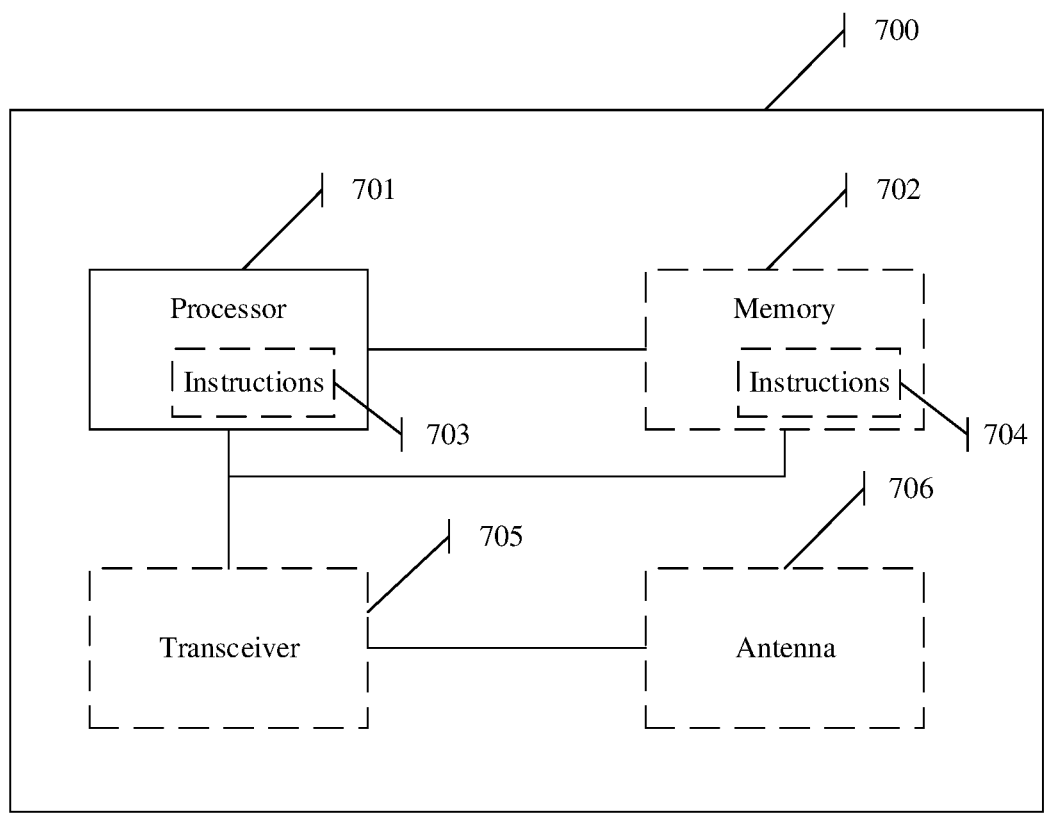
FIG. 7 is a schematic diagram of a structure of another communication apparatus according to an embodiment of this application.

FIG. 7 is a schematic diagram of a structure of another communication apparatus according to an embodiment of this application. The communication apparatus may be implemented by a hardware component. The apparatus 700 shown in FIG. 7 may be a first communication apparatus, or may be a chip, a chip system, a processor, or the like that supports the first communication apparatus in implementing the foregoing methods. Alternatively, the apparatus 700 may be a third communication apparatus, or may be a chip, a chip system, a processor, or the like that supports the third communication apparatus in implementing the foregoing methods. The apparatus 700 may be configured to implement the method performed by the first communication apparatus or the third communication apparatus described in the foregoing method embodiments. For details, refer to the descriptions in the foregoing method embodiments. The apparatus 700 has a function of implementing the first communication apparatus or the third communication apparatus described in embodiments of this application. For example, the apparatus 700 includes modules, units, or means (means) corresponding to the steps performed by the first communication apparatus or the third communication apparatus in the terminal described in embodiments of this application. The functions, units, or means may be implemented by software, or may be implemented by hardware, or may be implemented by hardware executing corresponding software, or may be implemented by a combination of software and hardware. For details, refer to the corresponding descriptions in the foregoing corresponding method embodiments.

The apparatus 700 may include one or more processors 701. The processor 701 may also be referred to as a processing unit, and can implement a specific control function. The processor 701 may be a general-purpose processor, a dedicated processor, or the like. For example, the processor 701 may be a baseband processor or a central processing unit. The baseband processor may be configured to process a communication protocol and communication data. The central processing unit may be configured to: control the communication apparatus (for example, a base station, a baseband chip, a terminal, a terminal chip, a distributed unit (distributed unit, DU), or a centralized unit (centralized unit, CU)), execute a software program, and process data of the software program.

In an optional design, the processor 701 may store instructions 703 and/or data, and the instructions 703 and/or data may be run by the processor, so that the apparatus 700 performs the methods described in the foregoing method embodiments.

In another optional design, the processor 701 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 700 may include a circuit, and the circuit may implement the sending, receiving, or communication function in the foregoing method embodiments.

Optionally, the apparatus 700 may include one or more memories 702. The memory may store instructions 704, and the instructions may be run on the processor, so that the apparatus 700 performs the methods described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor. The processor 701 and/or the memory 702 may be considered as the processing module 602 shown in FIG. 6.

Optionally, the apparatus 700 may further include a transceiver 705 and/or an antenna 706. The processor 701 may be referred to as a processing unit, and controls the apparatus 700. The transceiver 705 may be referred to as a transceiver unit, a transceiver machine, a transceiver circuit, a transceiver apparatus, a transceiver module, or the like, and is configured to implement sending and receiving functions. The transceiver 705 and/or the antenna 706 may be considered as the communication module 601 shown in FIG. 6.

Optionally, the apparatus 700 in this embodiment of this application may be configured to perform the method described in the foregoing embodiments of this application. The processor 701 may be configured to perform the steps performed by the processing module 602 shown in FIG. 6, and the transceiver 705 may be configured to perform the steps performed by the communication module 601 shown in FIG. 6. For specific steps performed by the processor 701 and the transceiver 705, refer to the descriptions of the steps performed by the processing module 602 and the communication module 601 in FIG. 6. Details are not described herein again.

The processor and the transceiver that are described in this application may be implemented on an integrated circuit (integrated circuit, IC), an analog IC, a radio frequency integrated circuit RFIC, a mixed signal IC, an application-specific integrated circuit (application-specific integrated circuit, ASIC), a printed circuit board (printed circuit board, PCB), an electronic device, or the like. The processor and the transceiver may be manufactured by using various IC processing technologies, for example, a complementary metal oxide semiconductor (complementary metal oxide semiconductor, CMOS), an n-type metal oxide semiconductor (n-type metal oxide semiconductor, NMOS), a p-type metal oxide semiconductor (p-type metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus described in the foregoing embodiment may be the terminal device. However, a range of the apparatus described in this application is not limited thereto, and a structure of the apparatus may not be limited to the structure in FIG. 7. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) another device or the like.

With reference to the foregoing description, this application further provides the following embodiments. It should be noted that numbers of the following embodiments do not necessarily need to comply with a numbering sequence of the foregoing embodiments.

Embodiment 1: A resource determining method, applied to a first communication apparatus, including:
  obtaining first resource information, where the first resource information is used to indicate a first-type resource and/or a second-type resource;
  determining a transmission resource based on a type of the first communication apparatus and the first resource information; and
  transmitting sidelink transmission data by using the transmission resource.

A type of the first communication apparatus includes a no-sensing type, a partial-sensing type, or a full-sensing type. The first-type resource meets: signal strength of the first-type resource is not less than a first threshold, or usage of the first-type resource is not less than a second threshold. The second-type resource meets: signal strength of the second-type resource is not greater than a third threshold, or usage of the second-type resource is not greater than a fourth threshold.

Embodiment 2: According to the method in Embodiment 1, the obtaining first resource information includes:
  receiving the first resource information from a third communication apparatus.

Embodiment 3: According to the method in Embodiment 1 or 2, before the obtaining first resource information, the method further includes:
  sending location information of the first communication apparatus to the third communication apparatus.

Embodiment 4: According to the method in any one of Embodiments 1 to 3, the first resource information is related to a location of the first communication apparatus.

Embodiment 5: According to the method in any one of Embodiments 2 to 4, the first resource information is at least one of a plurality of pieces of first resource information stored by the third communication apparatus.

Embodiment 6: According to the method in any one of Embodiments 2 to 5, the type of the first communication apparatus is the no-sensing type or the partial-sensing type.

Embodiment 7: According to the method in any one of Embodiments 2 to 6, the third communication apparatus includes a network device or a user equipment.

Embodiment 8: According to the method in Embodiment 1, the obtaining first resource information includes:
  receiving the first resource information from a second communication apparatus; and
  the transmitting sidelink transmission data by using the transmission resource includes:
  sending the sidelink transmission data to the second communication apparatus by using the transmission resource.

Embodiment 9: According to the method in any one of Embodiments 1 to 8, the determining a transmission resource based on a type of the first communication apparatus and the first resource information includes:
  determining that the first communication apparatus is of the no-sensing type; and
  determining the second-type resource or a resource other than the first-type resource as the transmission resource.

Embodiment 10: According to the method in any one of Embodiments 1 to 8, the determining a transmission resource based on a type of the first communication apparatus and the first resource information includes:
  determining that the type of the first communication apparatus is the partial-sensing type or the full-sensing type;

obtaining resources in a resource pool of the first communication apparatus; and determining, from the resources in the resource pool of the first communication apparatus, the second resource or a resource other than the first resource as the transmission resource.

The resources in the resource pool include a resource used by the first communication apparatus to transmit the sidelink transmission data.

Embodiment 11: According to the method in any one of Embodiments 1 to 8, the first resource information indicates the second-type resource, and the determining a transmission resource based on a type of the first communication apparatus and the first resource information includes:

determining that the first communication apparatus is of the partial-sensing type or the full-sensing type;

sensing the signal strength or the usage of the second-type resource; and determining the transmission resource from the second resource based on a sensing result.

Embodiment 12: According to the method in any one of Embodiments 1 to 8, the first resource information indicates the first-type resource, and the determining a transmission resource based on a type of the first communication apparatus and the first resource information includes:

determining that the first communication apparatus is of the partial-sensing type or the full-sensing type;

sensing signal strength or usage of a resource other than the first-type resource; and determining, based on a sensing result, the transmission resource from the resource other than the first-type resource.

Embodiment 13: According to the method in any one of Embodiments 1 to 8, the first resource information indicates the first-type resource, and the determining a transmission resource based on a type of the first communication apparatus and the first resource information includes:

determining that the first communication apparatus is of the partial-sensing type or the full-sensing type;

obtaining resources in a resource pool of the first communication apparatus, where the resources in the resource pool of the first communication apparatus include the first-type resource;

sensing signal strength of the resources in the resource pool of the first communication apparatus and priorities of data transmitted by using the resources;

determining a first signal strength threshold for the first-type resource based on a priority of the sidelink transmission data and a priority of data transmitted by using the first-type resource;

determining a second signal strength threshold for the first-type resource based on the first resource information, where the second signal strength threshold is less than the first signal strength threshold for the first-type resource; and determining, based on the second signal strength threshold and the signal strength of the first-type resource, whether to use the first-type resource as a candidate resource, where the candidate resource is used to determine the transmission resource.

Embodiment 14: According to the method in any one of Embodiments 1 to 8, the first resource information indicates the second-type resource, and the determining a transmission resource based on a type of the first communication apparatus and the first resource information includes:

determining that the first communication apparatus is of the partial-sensing type or the full-sensing type;

obtaining resources in a resource pool of the first communication apparatus, where the resources in the resource pool of the first communication apparatus include the second-type resource;

sensing signal strength of the resources in the resource pool of the first communication apparatus and priorities of data transmitted by using the resources;

determining a first signal strength threshold for the second-type resource based on a priority of the sidelink transmission data and a priority of data transmitted by using the second-type resource;

determining a second signal strength threshold for the second-type resource based on the first resource information, where the second signal strength threshold is less than the first signal strength threshold for the second-type resource; and determining, based on the second signal strength threshold and the signal strength of the second-type resource, whether to use the second-type resource as a candidate resource, where the candidate resource is used to determine the transmission resource.

Embodiment 15: According to the method in any one of Embodiments 1 to 8, the first resource information indicates the first-type resource and the second-type resource, and the determining a transmission resource based on a type of the first communication apparatus and the first resource information includes:

determining that the first communication apparatus is of the partial-sensing type or the full-sensing type;

obtaining resources in a resource pool of the first communication apparatus, where the resources in the resource pool of the first communication apparatus include the first-type resource and the second-type resource;

sensing signal strength of the resources in the resource pool of the first communication apparatus and priorities of data transmitted by using the resources;

determining a first signal strength threshold for the first-type resource based on a priority of the sidelink transmission data and a priority of data transmitted by using the first-type resource;

determining a first signal strength threshold for the second-type resource based on the priority of the sidelink transmission data and a priority of data transmitted by using the second-type resource;

determining a second signal strength threshold for the first-type resource and a second signal strength threshold for the second-type resource based on the first resource information, where the second signal strength threshold for the first-type resource is less than the first signal strength threshold for the first-type resource, and the second signal strength threshold for the second-type resource is less than the second signal strength threshold for the second-type resource;

determining, based on the second signal strength threshold for the first-type resource and the signal strength of the first-type resource, whether to use the first-type resource as a candidate resource; and determining, based on the second signal strength threshold for the second-type resource and the signal strength of the second-type resource, whether to use the second-type resource as the candidate resource, where the candidate resource is used to determine the transmission resource.

Embodiment 16: According to the method in any one of Embodiments 1 to 8, the first resource information indicates the first-type resource and the second-type resource, and the determining a transmission resource based on a type of the first communication apparatus and the first resource information includes:
  determining that the first communication apparatus is of the partial-sensing type or the full-sensing type;
  obtaining a resource other than the first-type resource from a resource pool of the first communication apparatus, where the resource other than the first-type resource includes the second-type resource;
  sensing signal strength of the resource other than the first-type resource and a priority of data transmitted by using the resource;
  determining a first signal strength threshold for the second-type resource based on a priority of the sidelink transmission data and a priority of data transmitted by using the second-type resource;
  determining a second signal strength threshold for the second-type resource based on the first resource information, where the second signal strength threshold is less than the first signal strength threshold for the second-type resource; and
  determining, based on the second signal strength threshold and the signal strength of the second-type resource, whether to use the second-type resource as a candidate resource, where the candidate resource is used to determine the transmission resource.

Embodiment 17: A resource determining method, applied to a third communication apparatus, including:
  determining a first-type resource and/or a second-type resource based on location information of a first communication apparatus; and
  sending first resource information to the first communication apparatus, where the first resource information is used to indicate the first-type resource and/or the second-type resource.

A type of the first communication apparatus includes a no-sensing type, a partial-sensing type, or a full-sensing type. The first-type resource meets: signal strength of the first-type resource is not less than a first threshold, or usage of the first-type resource is not less than a second threshold. The second-type resource meets: signal strength of the second-type resource is not greater than a third threshold, or usage of the second-type resource is not greater than a fourth threshold.

Embodiment 18: According to the method in Embodiment 17, the first resource information is used by the first communication apparatus to determine a transmission resource, where the transmission resource is used to transmit sidelink transmission data.

Embodiment 19: According to the method in Embodiment 17 or 18, the determining a first-type resource and/or a second-type resource based on location information of a first communication apparatus includes:
  obtaining a first correspondence, where the first correspondence includes a correspondence between location information and the first-type resource and/or the second-type resource; and
  determining, based on the first correspondence and the location information of the first communication apparatus, the first-type resource and/or the second-type resource corresponding to the location information of the first communication apparatus.

Embodiment 20: According to the method in Embodiment 19, the method further includes:
  receiving first information from a fourth communication apparatus, where the first information is used to indicate the first-type resource and/or the second-type resource determined by the fourth communication apparatus, and a type of the fourth communication apparatus is the full-sensing type;
  obtaining location information of the fourth communication apparatus; and
  determining the first correspondence based on the location information of the fourth communication apparatus and the first-type resource and/or the second-type resource determined by the fourth communication apparatus.

Embodiment 21: According to the method in Embodiment 20, the receiving first information from a fourth communication apparatus includes:
  receiving the first information in a process in which the fourth communication apparatus initially accesses the third communication apparatus; or
  receiving the first information according to a first periodicity.

Embodiment 22: According to the method in Embodiment 20 or 21, the method further includes:
  sending second information to the fourth communication apparatus, where the second information is used to request the first information.

Embodiment 23: According to the method in any one of Embodiments 17 to 22, the sending first resource information to the first communication apparatus includes:
  sending the first resource information in a process in which the first communication apparatus initially accesses the third communication apparatus;
  sending the first resource information according to a second periodicity; or
  sending the first resource information after it is determined that the location information of the first communication apparatus changes.

Embodiment 24: According to the method in any one of Embodiments 17 to 23, the method further includes:
  receiving third information from the first communication apparatus, where the third information is used to request the first resource information.

Embodiment 25: A resource determining method, applied to a fourth communication apparatus, including:
  determining first information, where the first information is used to indicate a first-type resource and/or a second-type resource determined by the fourth communication apparatus, signal strength of the first-type resource is not less than a first threshold, and/or usage of the first-type resource is not less than a second threshold, and signal strength of the second-type resource is not greater than a third threshold, and/or usage of the second-type resource is not greater than a fourth threshold; and
  sending the first information to a third communication apparatus.

Embodiment 26: According to the method in Embodiment 25, the method further includes:
  sending location information of the fourth communication apparatus to the third communication apparatus.

Embodiment 27: A resource determining method, applied to a second communication apparatus, including:
  determining first resource information, where the first information is used to indicate a first-type resource and/or a second-type resource determined by the second communication apparatus, signal strength of the first-type resource is not less than a first threshold, and/or usage of the first-type resource is not less than a second threshold, and signal strength of the second-type resource is not greater than a third threshold, and/or usage of the second-type resource is not greater than a fourth threshold; and sending the first resource information to a first communication apparatus.

Embodiment 28: According to the method in Embodiment 27, the method further includes:

sending location information of fourth communication apparatus to the first communication apparatus.

Embodiment 29: A first communication apparatus, including:

a processing module, configured to obtain first resource information, where the first resource information is used to indicate a first-type resource and/or a second-type resource, where the processing module is further configured to determine a transmission resource based on a type of the first communication apparatus and the first resource information; and a communication module, configured to transmit sidelink transmission data by using the transmission resource.

A type of the first communication apparatus includes a no-sensing type, a partial-sensing type, or a full-sensing type. The first-type resource meets: signal strength of the first-type resource is not less than a first threshold, or usage of the first-type resource is not less than a second threshold. The second-type resource meets: signal strength of the second-type resource is not greater than a third threshold, or usage of the second-type resource is not greater than a fourth threshold.

Embodiment 30: According to the first communication apparatus in Embodiment 29, the processing module is specifically configured to:

receive the first resource information from a third communication apparatus by using the communication module.

Embodiment 31: According to the first communication apparatus in Embodiment 29 or 30, the communication module is further configured to:

send location information of the first communication apparatus to the third communication apparatus.

Embodiment 32: According to the first communication apparatus in any one of Embodiments 29 to 31, the first resource information is related to a location of the first communication apparatus.

Embodiment 33: According to the first communication apparatus in any one of Embodiments 29 to 33, the first resource information is at least one of a plurality of pieces of first resource information stored by the third communication apparatus.

Embodiment 34: According to the first communication apparatus in any one of Embodiments 30 to 33, the type of the first communication apparatus is the no-sensing type or the partial-sensing type.

Embodiment 35: According to the first communication apparatus in any one of Embodiments 30 to 34, the third communication apparatus includes a network device or a user equipment.

Embodiment 36: According to the first communication apparatus in Embodiment 29, the processing module is specifically configured to:

receive the first resource information from a second communication apparatus; and the communication module is specifically configured to:

send the sidelink transmission data to the second communication apparatus by using the transmission resource.

Embodiment 37: According to the first communication apparatus in any one of Embodiments 29 to 36, the processing module is specifically configured to:

determine that the first communication apparatus is of the no-sensing type; and determine the second-type resource or a resource other than the first-type resource as the transmission resource.

Embodiment 38: According to the first communication apparatus in any one of Embodiments 29 to 36, the processing module is specifically configured to:

determine that the type of the first communication apparatus is the partial-sensing type or the full-sensing type;

obtain resources in a resource pool of the first communication apparatus; and determine, from the resources in the resource pool of the first communication apparatus, the second resource or a resource other than the first resource as the transmission resource, where the resources in the resource pool include a resource used by the first communication apparatus to transmit the sidelink transmission data.

Embodiment 39: According to the first communication apparatus in any one of Embodiments 29 to 36, the first resource information indicates the second-type resource, and the processing module is specifically configured to:

determine that the first communication apparatus is of the partial-sensing type or the full-sensing type;

sense the signal strength or the usage of the second-type resource; and determine the transmission resource from the second resource based on a sensing result.

Embodiment 40: According to the first communication apparatus in any one of Embodiments 29 to 36, the first resource information indicates the first-type resource, and the processing module is specifically configured to:

determine that the first communication apparatus is of the partial-sensing type or the full-sensing type;

sense signal strength or usage of a resource other than the first-type resource; and determine, based on a sensing result, the transmission resource from the resource other than the first-type resource.

Embodiment 41: According to the first communication apparatus in any one of Embodiments 29 to 36, the first resource information indicates the first-type resource, and the processing module is specifically configured to:

determine that the first communication apparatus is of the partial-sensing type or the full-sensing type;

obtain resources in a resource pool of the first communication apparatus, where the resources in the resource pool of the first communication apparatus include the first-type resource;

sense signal strength of the resources in the resource pool of the first communication apparatus and priorities of data transmitted by using the resources;

determine a first signal strength threshold for the first-type resource based on a priority of the sidelink transmission data and a priority of data transmitted by using the first-type resource;

determine a second signal strength threshold for the first-type resource based on the first resource information, where the second signal strength threshold is less than the first signal strength threshold for the first-type resource; and determine, based on the second signal strength threshold and the signal strength of the first-type resource, whether to use the first-type resource as a candidate resource, where the candidate resource is used to determine the transmission resource.

Embodiment 42: According to the first communication apparatus in any one of Embodiments 29 to 36, the first resource information indicates the second-type resource, and the processing module is specifically configured to:
  determine that the first communication apparatus is of the partial-sensing type or the full-sensing type;
  obtain resources in a resource pool of the first communication apparatus, where the resources in the resource pool of the first communication apparatus include the second-type resource;
  sense signal strength of the resources in the resource pool of the first communication apparatus and priorities of data transmitted by using the resources;
  determine a first signal strength threshold for the second-type resource based on a priority of the sidelink transmission data and a priority of data transmitted by using the second-type resource;
  determine a second signal strength threshold for the second-type resource based on the first resource information, where the second signal strength threshold is less than the first signal strength threshold for the second-type resource; and
  determine, based on the second signal strength threshold and the signal strength of the second-type resource, whether to use the second-type resource as a candidate resource, where the candidate resource is used to determine the transmission resource.

Embodiment 43: According to the first communication apparatus in any one of Embodiments 29 to 36, the first resource information indicates the first-type resource and the second-type resource, and the processing module is specifically configured to:
  determine that the first communication apparatus is of the partial-sensing type or the full-sensing type;
  obtain resources in a resource pool of the first communication apparatus, where the resources in the resource pool of the first communication apparatus include the first-type resource and the second-type resource;
  sense signal strength of the resources in the resource pool of the first communication apparatus and priorities of data transmitted by using the resources;
  determine a first signal strength threshold for the first-type resource based on a priority of the sidelink transmission data and a priority of data transmitted by using the first-type resource;
  determine a first signal strength threshold for the second-type resource based on the priority of the sidelink transmission data and a priority of data transmitted by using the second-type resource;
  determine a second signal strength threshold for the first-type resource and a second signal strength threshold for the second-type resource based on the first resource information, where the second signal strength threshold for the first-type resource is less than the first signal strength threshold for the first-type resource, and the second signal strength threshold for the second-type resource is less than the second signal strength threshold for the second-type resource;
  determine, based on the second signal strength threshold for the first-type resource and the signal strength of the first-type resource, whether to use the first-type resource as a candidate resource; and
  determine, based on the second signal strength threshold for the second-type resource and the signal strength of the second-type resource, whether to use the second-type resource as the candidate resource, where the candidate resource is used to determine the transmission resource.

Embodiment 44: According to the first communication apparatus in any one of Embodiments 29 to 36, the first resource information indicates the first-type resource and the second-type resource, and the processing module is specifically configured to:
  determine that the first communication apparatus is of the partial-sensing type or the full-sensing type;
  obtain a resource other than the first-type resource from a resource pool of the first communication apparatus, where the resource other than the first-type resource includes the second-type resource;
  sense signal strength of the resource other than the first-type resource and a priority of data transmitted by using the resource;
  determine a first signal strength threshold for the second-type resource based on a priority of the sidelink transmission data and a priority of data transmitted by using the second-type resource;
  determine a second signal strength threshold for the second-type resource based on the first resource information, where the second signal strength threshold is less than the first signal strength threshold for the second-type resource; and
  determine, based on the second signal strength threshold and the signal strength of the second-type resource, whether to use the second-type resource as a candidate resource, where the candidate resource is used to determine the transmission resource.

Embodiment 45: A third communication apparatus, including:
  a processing module, configured to determine a first-type resource and/or a second-type resource based on location information of a first communication apparatus; and
  a communication module, configured to send first resource information to the first communication apparatus.

A type of the first communication apparatus includes a no-sensing type, a partial-sensing type, or a full-sensing type. The first-type resource meets: signal strength of the first-type resource is not less than a first threshold, or usage of the first-type resource is not less than a second threshold. The second-type resource meets: signal strength of the second-type resource is not greater than a third threshold, or usage of the second-type resource is not greater than a fourth threshold.

Embodiment 46: According to the third communication apparatus in Embodiment 45, the first resource information is used by the first communication apparatus to determine a transmission resource, where the transmission resource is used to transmit sidelink transmission data.

Embodiment 47: According to the third communication apparatus in Embodiment 45 or 46, the processing module is specifically configured to:
  obtain a first correspondence, where the first correspondence includes a correspondence between location information and the first-type resource and/or the second-type resource; and
  determine, based on the first correspondence and the location information of the first communication apparatus, the first-type resource and/or the second-type resource corresponding to the location information of the first communication apparatus.

Embodiment 48: According to the third communication apparatus in Embodiment 47, the communication module is further configured to:
   receive first information from a fourth communication apparatus, where the first information is used to indicate the first-type resource and/or the second-type resource determined by the fourth communication apparatus, and a type of the fourth communication apparatus is the full-sensing type; and
the processing module is further configured to:
   obtain location information of the fourth communication apparatus; and
   determine the first correspondence based on the location information of the fourth communication apparatus and the first-type resource and/or the second-type resource determined by the fourth communication apparatus.

Embodiment 49: According to the third communication apparatus in Embodiment 48, the communication module is specifically configured to:
   receive the first information in a process in which the fourth communication apparatus initially accesses the third communication apparatus; or
   receive the first information according to a first periodicity.

Embodiment 50: According to the third communication apparatus in Embodiment 48 or 49, the communication module is further configured to:
   send second information to the fourth communication apparatus, where the second information is used to request the first information.

Embodiment 51: According to the third communication apparatus in any one of Embodiments 45 to 20, the communication module is specifically configured to:
   send the first resource information in a process in which the first communication apparatus initially accesses the third communication apparatus;
   send the first resource information according to a second periodicity; or
   send the first resource information after it is determined that the location information of the first communication apparatus changes.

Embodiment 52: According to the third communication apparatus in any one of Embodiments 45 to 51, the communication module is further configured to:
   receive third information from the first communication apparatus, where the third information is used to request the first resource information.

Embodiment 53: A fourth communication apparatus, including:
   a processing module, configured to determine first information, where the first information is used to indicate a first-type resource and/or a second-type resource determined by the fourth communication apparatus, signal strength of the first-type resource is not less than a first threshold, and/or usage of the first-type resource is not less than a second threshold, and signal strength of the second-type resource is not greater than a third threshold, and/or usage of the second-type resource is not greater than a fourth threshold; and
   a communication module, configured to send the first information to a third communication apparatus.

Embodiment 54: According to the fourth communication apparatus in Embodiment 53, the communication module is further configured to:
   send location information of the fourth communication apparatus to the third communication apparatus.

Embodiment 55: A fourth communication apparatus, including:
   a processing module, configured to determine first information, where the first information is used to indicate a first-type resource and/or a second-type resource determined by the fourth communication apparatus, signal strength of the first-type resource is not less than a first threshold, and/or usage of the first-type resource is not less than a second threshold, and signal strength of the second-type resource is not greater than a third threshold, and/or usage of the second-type resource is not greater than a fourth threshold; and
   a communication module, configured to send the first information to a third communication apparatus.

Embodiment 56: According to the fourth communication apparatus in Embodiment 55, the communication module is further configured to:
   send location information of the fourth communication apparatus to the third communication apparatus.

Embodiment 57: A communication system, including:
   a third communication apparatus, configured to determine a first-type resource and/or a second-type resource based on location information of a first communication apparatus.

The third communication apparatus is further configured to send first resource information to the first communication apparatus. The first resource information is used to indicate the first-type resource and/or the second-type resource.

The first communication apparatus is configured to receive the first resource information.

The first communication apparatus is further configured to determine a transmission resource based on a type of the first communication apparatus and the first resource information.

The first communication apparatus is further configured to transmit sidelink transmission data by using the transmission resource.

A type of the first communication apparatus includes a no-sensing type, a partial-sensing type, or a full-sensing type. The first-type resource meets: signal strength of the first-type resource is not less than a first threshold, or usage of the first-type resource is not less than a second threshold. The second-type resource meets: signal strength of the second-type resource is not greater than a third threshold, or usage of the second-type resource is not greater than a fourth threshold.

Embodiment 58: According to the communication system in Embodiment 57, the first communication apparatus is further configured to:
   send the location information of the first communication apparatus to the third communication apparatus.

Embodiment 59: According to the communication system in Embodiment 57 or 58, the first resource information is at least one of a plurality of pieces of first resource information stored by the third communication apparatus.

Embodiment 60: According to the method in any one of Embodiments 57 to 59, the type of the first communication apparatus is the no-sensing type or the partial-sensing type.

Embodiment 61: According to the method in any one of Embodiments 57 to 60, the third communication apparatus includes a network device or a user equipment.

Embodiment 62: According to the communication system in any one of Embodiments 57 to 61, the first communication apparatus is specifically configured to:
   determine that the first communication apparatus is of the no-sensing type; and determine the second-type resource or a resource other than the first-type resource as the transmission resource.

Embodiment 62: According to the communication system in any one of Embodiments 57 to 61, the first communication apparatus is specifically configured to:
determine that the type of the first communication apparatus is the partial-sensing type or the full-sensing type;
obtain resources in a resource pool of the first communication apparatus; and
determine, from the resources in the resource pool of the first communication apparatus, the second resource or a resource other than the first resource as the transmission resource.

The resources in the resource pool include a resource used by the first communication apparatus to transmit the sidelink transmission data.

Embodiment 63: According to the communication system in any one of Embodiments 57 to 61, the first resource information indicates the second-type resource, and the first communication apparatus is specifically configured to:
determine that the first communication apparatus is of the partial-sensing type or the full-sensing type;
sense the signal strength or the usage of the second-type resource; and
determine the transmission resource from the second resource based on a sensing result.

Embodiment 64: According to the communication system in any one of Embodiments 57 to 61, the first resource information indicates the first-type resource, and the first communication apparatus is specifically configured to:
determine that the first communication apparatus is of the partial-sensing type or the full-sensing type;
sense signal strength or usage of a resource other than the first-type resource; and
determine, based on a sensing result, the transmission resource from the resource other than the first-type resource.

Embodiment 65: According to the communication system in any one of Embodiments 57 to 61, the first resource information indicates the first-type resource, and the first communication apparatus is specifically configured to:
determine that the first communication apparatus is of the partial-sensing type or the full-sensing type;
obtain resources in a resource pool of the first communication apparatus, where the resources in the resource pool of the first communication apparatus include the first-type resource;
sense signal strength of the resources in the resource pool of the first communication apparatus and priorities of data transmitted by using the resources;
determine a first signal strength threshold for the first-type resource based on a priority of the sidelink transmission data and a priority of data transmitted by using the first-type resource;
determine a second signal strength threshold for the first-type resource based on the first resource information, where the second signal strength threshold is less than the first signal strength threshold for the first-type resource; and
determine, based on the second signal strength threshold and the signal strength of the first-type resource, whether to use the first-type resource as a candidate resource, where the candidate resource is used to determine the transmission resource.

Embodiment 66: According to the communication system in any one of Embodiments 57 to 61, the first resource information indicates the second-type resource, and the first communication apparatus is specifically configured to:
determine that the first communication apparatus is of the partial-sensing type or the full-sensing type;
obtain resources in a resource pool of the first communication apparatus, where the resources in the resource pool of the first communication apparatus include the second-type resource;
sense signal strength of the resources in the resource pool of the first communication apparatus and priorities of data transmitted by using the resources;
determine a first signal strength threshold for the second-type resource based on a priority of the sidelink transmission data and a priority of data transmitted by using the second-type resource;
determine a second signal strength threshold for the second-type resource based on the first resource information, where the second signal strength threshold is less than the first signal strength threshold for the second-type resource; and
determine, based on the second signal strength threshold and the signal strength of the second-type resource, whether to use the second-type resource as a candidate resource, where the candidate resource is used to determine the transmission resource.

Embodiment 67: According to the communication system in any one of Embodiments 57 to 61, the first resource information indicates the first-type resource and the second-type resource, and the first communication apparatus is specifically configured to:
determine that the first communication apparatus is of the partial-sensing type or the full-sensing type;
obtain resources in a resource pool of the first communication apparatus, where the resources in the resource pool of the first communication apparatus include the first-type resource and the second-type resource;
sense signal strength of the resources in the resource pool of the first communication apparatus and priorities of data transmitted by using the resources;
determine a first signal strength threshold for the first-type resource based on a priority of the sidelink transmission data and a priority of data transmitted by using the first-type resource;
determine a first signal strength threshold for the second-type resource based on the priority of the sidelink transmission data and a priority of data transmitted by using the second-type resource;
determine a second signal strength threshold for the first-type resource and a second signal strength threshold for the second-type resource based on the first resource information, where the second signal strength threshold for the first-type resource is less than the first signal strength threshold for the first-type resource, and the second signal strength threshold for the second-type resource is less than the second signal strength threshold for the second-type resource;
determine, based on the second signal strength threshold for the first-type resource and the signal strength of the first-type resource, whether to use the first-type resource as a candidate resource; and
determine, based on the second signal strength threshold for the second-type resource and the signal strength of the second-type resource, whether to use the second-type resource as the candidate resource, where the candidate resource is used to determine the transmission resource.

Embodiment 68: According to the communication system in any one of Embodiments 57 to 61, the first resource information indicates the first-type resource and the second-type resource, and the first communication apparatus is specifically configured to:
  determine that the first communication apparatus is of the partial-sensing type or the full-sensing type;
  obtain a resource other than the first-type resource from a resource pool of the first communication apparatus, where the resource other than the first-type resource includes the second-type resource;
  sense signal strength of the resource other than the first-type resource and a priority of data transmitted by using the resource;
  determine a first signal strength threshold for the second-type resource based on a priority of the sidelink transmission data and a priority of data transmitted by using the second-type resource;
  determine a second signal strength threshold for the second-type resource based on the first resource information, where the second signal strength threshold is less than the first signal strength threshold for the second-type resource; and
  determine, based on the second signal strength threshold and the signal strength of the second-type resource, whether to use the second-type resource as a candidate resource, where the candidate resource is used to determine the transmission resource.

Embodiment 69: According to the communication system in any one of Embodiments 57 to 68, the third communication apparatus is specifically configured to:
  obtain a first correspondence, where the first correspondence includes a correspondence between location information and the first-type resource and/or the second-type resource; and
  determine, based on the first correspondence and the location information of the first communication apparatus, the first-type resource and/or the second-type resource corresponding to the location information of the first communication apparatus.

Embodiment 70: According to the communication system in Embodiment 69, the communication system further includes a fourth communication apparatus, configured to:
  determine first information, where the first information is used to indicate the first-type resource and/or the second-type resource determined by the fourth communication apparatus; and
  send the first information to the third communication apparatus; and
  the third communication apparatus is further configured to:
  receive the first information from the fourth communication apparatus, where the first information is used to indicate the first-type resource and/or the second-type resource corresponding to the fourth communication apparatus;
  obtain location information of the fourth communication apparatus; and
  determine the first correspondence based on the location information of the fourth communication apparatus and the first-type resource and/or the second-type resource corresponding to the fourth communication apparatus.

Embodiment 71: According to the communication system in Embodiment 70, the fourth communication apparatus is further configured to:
  send the location information of the fourth communication apparatus.

Embodiment 72: According to the communication system in Embodiment 70 or 71, the third communication apparatus is specifically configured to:
  receive the first information in a process in which the fourth communication apparatus initially accesses the third communication apparatus; or
  receive the first information according to a first periodicity.

Embodiment 73: According to the communication system in any one of Embodiments 70 to 72, the third communication apparatus is further configured to:
  send second information to the fourth communication apparatus, where the second information is used to request resource information sensed by the fourth communication apparatus.

Embodiment 74: According to the communication system in any one of Embodiments 57 to 73, the third communication apparatus is specifically configured to:
  send the first resource information in a process in which the first communication apparatus initially accesses the third communication apparatus;
  send the first resource information according to a second periodicity; or
  send the first resource information when the location information of the first communication apparatus changes.

Embodiment 75: According to the communication system in any one of Embodiments 57 to 74, the third communication apparatus is further configured to:
  receive third information from the first communication apparatus, where the third information is used to request information about a resource related to the first communication apparatus.

Embodiment 76: A communication system, including:
  a second communication apparatus, configured to determine first resource information, where the first resource information is used to indicate a first-type resource and/or a second-type resource determined by the second communication apparatus, signal strength of the first-type resource is not less than a first threshold, and/or usage of the first-type resource is not less than a second threshold, and signal strength of the second-type resource is not greater than a third threshold, and/or usage of the second-type resource is not greater than a fourth threshold.

The second communication apparatus is further configured to send the first resource information to the first communication apparatus.

The first communication apparatus is configured to receive the second resource information.

The first communication apparatus is further configured to select a transmission resource based on a type of the first communication apparatus and the first resource information.

The first communication apparatus is further configured to send sidelink transmission data to the second communication apparatus by using the transmission resource.

Embodiment 77: According to the communication apparatus in Embodiment 76, the second communication apparatus is further configured to:
  send location information of the second communication apparatus.

Embodiment 78: According to the communication system in Embodiment 76 or 77, the first communication apparatus is specifically configured to:
  determine that the first communication apparatus is of a no-sensing type; and determine the second-type resource or a resource other than the first-type resource as the transmission resource.

Embodiment 79: According to the communication system in Embodiment 76 or 77, the first communication apparatus is specifically configured to:
  determine that the type of the first communication apparatus is a partial-sensing type or a full-sensing type;
  obtain resources in a resource pool of the first communication apparatus; and
  determine, from the resources in the resource pool of the first communication apparatus, the second resource or a resource other than the first resource as the transmission resource.

The resources in the resource pool include a resource used by the first communication apparatus to transmit the sidelink transmission data.

Embodiment 80: According to the communication system in Embodiment 76 or 77, the first resource information indicates the second-type resource, and the first communication apparatus is specifically configured to:
  determine that the first communication apparatus is of a partial-sensing type or a full-sensing type;
  sense the signal strength or the usage of the second-type resource; and
  determine the transmission resource from the second resource based on a sensing result.

Embodiment 81: According to the communication system in Embodiment 76 or 77, the first resource information indicates the first-type resource, and the first communication apparatus is specifically configured to:
  determine that the first communication apparatus is of a partial-sensing type or a full-sensing type;
  sense signal strength or usage of a resource other than the first-type resource; and
  determine, based on a sensing result, the transmission resource from the resource other than the first-type resource.

Embodiment 82: According to the communication system in Embodiment 76 or 77, the first resource information indicates the first-type resource, and the first communication apparatus is specifically configured to:
  determine that the first communication apparatus is of a partial-sensing type or a full-sensing type;
  obtain resources in a resource pool of the first communication apparatus, where the resources in the resource pool of the first communication apparatus include the first-type resource;
  sense signal strength of the resources in the resource pool of the first communication apparatus and priorities of data transmitted by using the resources;
  determine a first signal strength threshold for the first-type resource based on a priority of the sidelink transmission data and a priority of data transmitted by using the first-type resource;
  determine a second signal strength threshold for the first-type resource based on the first resource information, where the second signal strength threshold is less than the first signal strength threshold for the first-type resource; and
  determine, based on the second signal strength threshold and the signal strength of the first-type resource, whether to use the first-type resource as a candidate resource, where the candidate resource is used to determine the transmission resource.

Embodiment 83: According to the communication system in Embodiment 76 or 77, the first resource information indicates the second-type resource, and the first communication apparatus is specifically configured to:
  determine that the first communication apparatus is of a partial-sensing type or a full-sensing type;
  obtain resources in a resource pool of the first communication apparatus, where the resources in the resource pool of the first communication apparatus include the second-type resource;
  sense signal strength of the resources in the resource pool of the first communication apparatus and priorities of data transmitted by using the resources;
  determine a first signal strength threshold for the second-type resource based on a priority of the sidelink transmission data and a priority of data transmitted by using the second-type resource;
  determine a second signal strength threshold for the second-type resource based on the first resource information, where the second signal strength threshold is less than the first signal strength threshold for the second-type resource; and
  determine, based on the second signal strength threshold and the signal strength of the second-type resource, whether to use the second-type resource as a candidate resource, where the candidate resource is used to determine the transmission resource.

Embodiment 84: According to the communication system in Embodiment 76 or 77, the first resource information indicates the first-type resource and the second-type resource, and the first communication apparatus is specifically configured to:
  determine that the first communication apparatus is of a partial-sensing type or a full-sensing type;
  obtain resources in a resource pool of the first communication apparatus, where the resources in the resource pool of the first communication apparatus include the first-type resource and the second-type resource;
  sense signal strength of the resources in the resource pool of the first communication apparatus and priorities of data transmitted by using the resources;
  determine a first signal strength threshold for the first-type resource based on a priority of the sidelink transmission data and a priority of data transmitted by using the first-type resource;
  determine a first signal strength threshold for the second-type resource based on the priority of the sidelink transmission data and a priority of data transmitted by using the second-type resource;
  determine a second signal strength threshold for the first-type resource and a second signal strength threshold for the second-type resource based on the first resource information, where the second signal strength threshold for the first-type resource is less than the first signal strength threshold for the first-type resource, and the second signal strength threshold for the second-type resource is less than the second signal strength threshold for the second-type resource;
  determine, based on the second signal strength threshold for the first-type resource and the signal strength of the first-type resource, whether to use the first-type resource as a candidate resource; and
  determine, based on the second signal strength threshold for the second-type resource and the signal strength of the second-type resource, whether to use the second-type resource as the candidate resource, where the candidate resource is used to determine the transmission resource.

Embodiment 85: According to the communication system in Embodiment 76 or 77, the first resource information indicates the first-type resource and the second-type resource, and the first communication apparatus is specifically configured to:
  determine that the first communication apparatus is of a partial-sensing type or a full-sensing type;
  obtain a resource other than the first-type resource from a resource pool of the first communication apparatus, where the resource other than the first-type resource includes the second-type resource;
  sense signal strength of the resource other than the first-type resource and a priority of data transmitted by using the resource;
  determine a first signal strength threshold for the second-type resource based on a priority of the sidelink transmission data and a priority of data transmitted by using the second-type resource;
  determine a second signal strength threshold for the second-type resource based on the first resource information, where the second signal strength threshold is less than the first signal strength threshold for the second-type resource; and
  determine, based on the second signal strength threshold and the signal strength of the second-type resource, whether to use the second-type resource as a candidate resource, where the candidate resource is used to determine the transmission resource.

Embodiment 86: According to the communication apparatus in Embodiments 76 to 85, the second communication apparatus is specifically configured to:
  send the second resource information according to a third periodicity; or
  send the first resource information based on fourth information from the first communication apparatus, where the fourth information is used to request the first resource information.

Embodiment 87: A communication apparatus, configured to perform the method in any one of Embodiments 1 to 28.

Embodiment 88: A communication apparatus, including a processor, where the processor is coupled to a memory, the memory is configured to store a program or instructions, and when the program or the instructions are executed by the processor, the apparatus is enabled to perform the method in any one of Embodiments 1 to 28.

Embodiment 89: A computer-readable medium, where the computer-readable medium stores a program or instructions, and when the program or the instructions are executed, a computer is enabled to perform the method in any one of Embodiments 1 to 28.

Embodiment 90: A chip, where the chip is coupled to a memory, and is configured to read and execute a program or instructions stored in the memory, to implement the method in any one of Embodiments 1 to 28.

It should be understood that the components included in the communication apparatus in the foregoing embodiments are illustrative, and are merely a possible example. In an actual implementation, the components included in the communication apparatus may have another composition manner. In addition, the components in the foregoing communication apparatus may be integrated into one module, or may exist alone physically. The foregoing integrated module may be implemented in a form of hardware, or may be implemented in a form of a software function module. It should not be understood that the structure shown in the foregoing accompanying drawings is limited.

Based on a same concept as the foregoing method embodiments, an embodiment of this application further provides a computer-readable storage medium. The computer-readable storage medium stores a computer program. When the program is executed by a processor, a computer is enabled to perform an operation performed by the first communication apparatus or the third communication apparatus in any one of the foregoing method embodiments or the possible implementations of the foregoing method embodiments.

Based on a same concept as the foregoing method embodiments, this application further provides a computer program product. When the computer program product is invoked and executed by a computer, the computer is enabled to implement an operation performed by the first communication apparatus or the third communication apparatus in any one of the foregoing method embodiments or the possible implementations of the foregoing method embodiments.

Based on a same concept as the foregoing method embodiments, this application further provides a chip or a chip system. The chip may include a processor. The chip may further include a memory (or a storage module) and/or a transceiver (or a communication module); or the chip is coupled to a memory (or a storage module) and/or a transceiver (or a communication module). The transceiver (or the communication module) may be configured to support the chip in performing wired and/or wireless communication. The memory (or the storage module) may be configured to store a program. The processor invokes the program to implement an operation performed by the first communication apparatus or the third communication apparatus in any one of the foregoing method embodiments or the possible implementations of the foregoing method embodiments. The chip system may include the chip, or may include the chip and another discrete component, such as a memory (or a storage module) and/or a transceiver (or a communication module).

Based on a same concept as the foregoing method embodiments, this application further provides a communication system. The communication system may be configured to implement an operation performed by the first communication apparatus or the third communication apparatus in any one of the foregoing method embodiments or the possible implementations of the foregoing method embodiments. For example, the communication system has a structure shown in FIG. 1 or FIG. 2.

Embodiments of this application are described with reference to the flowcharts and/or block diagrams of the method, the apparatus, and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. A resource determining method comprising:
   obtaining first resource information, wherein the first resource information is used to indicate at least one of a first-type resource or a second-type resource;
   determining a transmission resource based on a type of a first communication apparatus and the first resource information; and
   transmitting sidelink transmission data based on the transmission resource;
   wherein the type of the first communication apparatus comprises a no-sensing type, a partial-sensing type, or a full-sensing type;
   wherein a signal strength of the first-type resource is not less than a first threshold; and
   wherein a signal strength of the second-type resource is not greater than a third threshold.

2. The method according to claim 1, wherein the obtaining first resource information comprises:
   receiving the first resource information from a second communication apparatus; and
   wherein the transmitting sidelink transmission data based on the transmission resource comprises:
      sending the sidelink transmission data to the second communication apparatus based on the transmission resource.

3. The method according to claim 1, wherein the determining the transmission resource based on the type of the first communication apparatus and the first resource information comprises:
   determining that the first communication apparatus is of the no-sensing type; and
   determining the second-type resource, or a resource other than the first-type resource, as the transmission resource.

4. The method according to claim 1, wherein the determining the transmission resource based on the type of the first communication apparatus and the first resource information comprises:
   determining that the type of the first communication apparatus is the partial-sensing type or the full-sensing type;
   obtaining resources in a resource pool of the first communication apparatus; and
   determining, from the resources in the resource pool of the first communication apparatus, the second resource, or a resource other than the first resource, as the transmission resource;
   wherein the first communication apparatus transmits the sidelink transmission data based on a resource comprised in the resource pool.

5. The method according to claim 1, wherein the first-type resource is a non-recommended resource, and the second-type resource is a recommended resource.

6. The method according to claim 1, wherein the determining the transmission resource based on the type of the first communication apparatus and the first resource information comprises determining a resource other than the first-type resource or the second-type resource as the transmission resource.

7. The method according to claim 1, wherein there are a plurality of second-type resources, and the determining the transmission resource comprises:
   selecting a transmission resource from the plurality of second-type resources in a random selection manner.

8. The method according to claim 1, wherein the first resource information is related to a location of the first communication apparatus.

9. A first communication apparatus comprising:
   a processor; and
   a non-transitory computer-readable storage medium storing a program to be executed by the processor, the program including instructions for:
      obtaining first resource information, wherein the first resource information indicates a first-type resource or a second-type resource;
      determining a transmission resource based on a type of the first communication apparatus and the first resource information; and
      transmitting sidelink transmission data based on the transmission resource;
      wherein the type of the first communication apparatus comprises a no-sensing type, a partial-sensing type, or a full-sensing type;
      wherein a signal strength of the first-type resource is not less than a first threshold; and
      wherein a signal strength of the second-type resource is not greater than a third threshold.

10. The first communication apparatus according to claim 9, wherein the obtaining first resource information comprises:
    receiving the first resource information from a second communication apparatus; and
    wherein the transmitting sidelink transmission data based on the transmission resource comprises:
       sending the sidelink transmission data to the second communication apparatus based on the transmission resource.

11. The communication apparatus according to claim 9, wherein the determining the transmission resource based on the type of the first communication apparatus and the first resource information comprises:
    determining that the first communication apparatus is of the no-sensing type; and
    determining the second-type resource, or a resource other than the first-type resource, as the transmission resource.

12. The communication apparatus according to claim 9, wherein the determining the transmission resource based on the type of the first communication apparatus and the first resource information comprises:
    determining that the type of the first communication apparatus is the partial-sensing type or the full-sensing type;
    obtaining resources in a resource pool of the first communication apparatus; and determining, from the resources in the resource pool of the first communication apparatus, the second resource, or a resource other than the first resource, as the transmission resource;

wherein the first communication apparatus transmits the sidelink transmission data based on a resource comprised in the resource pool.

13. The communication apparatus according to claim 9, wherein the first-type resource is a non-recommended resource, and the second-type is a recommended resource.

14. The communication apparatus according to claim 9, wherein the determining the transmission resource comprises:

determining a resource other than the first-type resource or the second-type resource as the transmission resource.

15. The communication apparatus according to claim 9, wherein there are a plurality of second-type resources, and the determining the transmission resource comprises:

selecting a transmission resource from the plurality of second-type resources in a random selection manner.

16. The communication apparatus according to claim 9, wherein the first resource information is related to a location of the first communication apparatus.

17. A non-transitory computer-readable storage medium storing a program to be executed by a processor, the program including instructions for:

obtaining first resource information, wherein the first resource information indicates at least one of a first-type resource or a second-type resource;

determining a transmission resource based on a type of a first communication apparatus and the first resource information; and transmitting sidelink transmission data based on the transmission resource;

wherein the type of the first communication apparatus comprises a no-sensing type, a partial-sensing type, or a full-sensing type;

wherein a signal strength of the first-type resource is not less than a first threshold; and wherein a signal strength of the second-type resource is not greater than a third threshold.

18. The non-transitory computer-readable medium according to claim 17, wherein the instructions for obtaining first resource information comprise instructions for:

receiving the first resource information from a second communication apparatus; and wherein the instructions for transmitting sidelink transmission data based on the transmission resource comprise instructions for:

sending the sidelink transmission data to the second communication apparatus based on the transmission resource.

19. The non-transitory computer-readable medium according to claim 17, wherein the instructions for determining the transmission resource based on the type of the first communication apparatus and the first resource information comprise instructions for:

determining that the first communication apparatus is of the no-sensing type; and determining the second-type resource or a resource other than the first-type resource as the transmission resource.

20. The computer-readable medium according to claim 17, wherein the instructions for determining the transmission resource based on the type of the first communication apparatus and the first resource information comprise instructions for:

determining that the type of the first communication apparatus is the partial-sensing type or the full-sensing type;

obtaining resources in a resource pool of the first communication apparatus; and determining, from the resources in the resource pool of the first communication apparatus, the second resource or a resource other than the first resource as the transmission resource;

wherein the first communication apparatus transmits the sidelink transmission data based on a resource comprised in the resource pool.

* * * * *